United States Patent
Wang et al.

[11] Patent Number: 6,148,104
[45] Date of Patent: *Nov. 14, 2000

[54] INCREMENTAL IDEOGRAPHIC CHARACTER INPUT METHOD

[75] Inventors: Chung-Ning Wang, San Jose; John C. Platt, Fremont; Nada P. Matic, San Jose, all of Calif.

[73] Assignee: Synaptics, Inc., San Jose, Calif.

[*] Notice: This patent is subject to a terminal disclaimer.

[21] Appl. No.: 09/231,911

[22] Filed: Jan. 14, 1999

Related U.S. Application Data

[63] Continuation of application No. 08/751,514, Nov. 15, 1996, Pat. No. 5,926,566.

[51] Int. Cl.[7] .................................................. G06K 9/18
[52] U.S. Cl. ........................ 382/185; 382/187; 382/189
[58] Field of Search .................................... 382/185, 187, 382/189, 202, 310; 364/926.8

[56] References Cited

U.S. PATENT DOCUMENTS

| | | | |
|---|---|---|---|
| 3,754,459 | 8/1973 | Coleman et al. | 95/4.5 |
| 4,365,235 | 12/1982 | Greanias et al. | 382/189 |
| 4,561,105 | 12/1985 | Crane et al. | 382/13 |
| 4,653,107 | 3/1987 | Shojima et al. | 382/13 |
| 4,829,583 | 5/1989 | Monroe et al. | 382/13 |
| 5,521,986 | 5/1996 | Curtin, II et al. | 382/187 |
| 5,699,455 | 12/1997 | Arai et al. | 382/187 |
| 5,787,197 | 7/1998 | Beigi et al. | 382/187 |
| 5,926,566 | 7/1999 | Wang et al. | 382/185 |

*Primary Examiner*—Jose L. Couso
*Assistant Examiner*—Anh Hong Do
*Attorney, Agent, or Firm*—Sierra Patent Group, Ltd.

[57] ABSTRACT

A method for incremental recognition of ideographic handwriting comprises in order the steps of: (1) entering in a natural stroke order at least one stroke of an ideographic character from a computer entry tablet; (2) providing the at least one stroke to an incremental character recognizer, which produces a hypothesis list of at least one candidate character; (3) displaying a hypothesis list of candidate characters containing the at least one stroke; (4) selecting a correct character from among the candidate characters on the hypothesis list if it a correct character appears thereon; (5) entering in natural stroke order at least one additional stroke of the ideographic character from the computer entry tablet if no candidate character is a correct character; (6) providing the additional stroke(s) to the incremental character recognizer, which produces an updated hypothesis list; (7) displaying the updated hypothesis list of candidate characters containing every stroke; (8) selecting a correct character from among the candidate characters on the updated hypothesis list if it a correct character appears thereon; and (9) repeating steps (5) through (8) until a correct character is selected from the updated hypothesis list.

24 Claims, 14 Drawing Sheets

INCREMENTAL IDEOGRAPHIC CHARACTER INPUT METHOD

RELATED U.S. APPLICATION DATA

This is a continuation of application Ser. No. 08/751,514 filed on Nov. 15, 1996, now U.S. Pat. No. 5,926,566, in the names of inventors Chung-Ning Wang, John C. Platt and Nada P. Matic, and assigned to Synaptics, Inc.

BACKGROUND OF THE INVENTION

1. Field of the Invention

The present invention relates to a user interface for entry of ideographic characters into a computer.

2. The Prior Art

Computer entry of ideographic characters presents a difficult user interface problem. For example, in the basic Chinese "alphabet", there are 5,401 characters, each character corresponding to a different meaning or word. A keyboard having 5,401 keys is impossible to either build or use as a practical matter.

The prior art contains two different ways of approaching this problem. The first employs a keyboard where more than one key is required to enter a character. The second employs a tablet and a software handwriting recognition system that recognizes entire characters.

There are various keyboard entry methods for ideographic characters. For example, there is a keyboard, called the Ziran Input System, produced by Multi-Corp of Calgary, Canada, where each key corresponds to a particular stroke type (horizontal, vertical, L-shaped, etc.). In order to enter a character, a user must decide which shape of stroke is closest to the one he or she desired, then presses the corresponding key. There are other keyboard entry systems, where each key corresponds to a particular sound or subset of the character (known as a radical). See, e.g., U.S. Pat. No. 5,131,766 to Wong; U.S. Pat. No. 4,669,901 to Feng; or U.S. Pat. No. 4,684,926 to Yong-Min.

All of these keyboard entry systems are non-intuitive. Each requires an extensive practice period for proficiency. For example, for the Ziran Input System, a novice user typically uses a finger to write out the entire character on the table before pressing any keys. The difficulty arises from the fact that it is non-obvious which stroke type is actually closest the desired character. This determination requires some thought from the novice user.

For Asian ideographic character entry, another source of difficulty of entry is the number of strokes in a character. Some characters comprise up to 30 strokes.

There is a mitigating factor that improves the usability of the Ziran Input System. The system provides multiple hypotheses after every keypress. The hypotheses are a list of up to about 10 characters that are consistent with the keys pressed so far. Typically, the user only needs to enter in the first four to six strokes of a character before the system narrows the list of candidates down to one or two possible characters. A user can select one of the candidates from the list at any time. This incremental approach speeds up the entry rate by a factor of about 2–4.

The other approach for entering ideographic characters is to use a pen to naturally write an entire character on a graphics tablet. For example, see U.S. Pat. No. 4,561,105 to Crane, et al.; U.S. Pat. No. 4,365,235 to Greanias, et al., or U.S. Pat. No. 5,462,711 to Kitamura. A software recognition system attempts to find the character that most closely matches the strokes entered on the tablet. Some ideographic character recognizers only recognize neatly printed characters. However, neatly printing the entire character can take a long time. To speed up the character entry process, people will naturally connect strokes to form cursive writing. However, cursive writing can be very idiosyncratic and/or very sloppy, which results in poor accuracy when the software tries to recognize what was written.

In addition, prior art examples of ideographic character recognizers require a tablet with either a display immediately underneath the tablet, or a tablet that senses the proximity of the pen hovering above the tablet. These technologies have been hitherto necessary to allow the effective combination of writing strokes and selecting commands and/or character hypotheses. However, both of these technologies are expensive, and add cost to any handwriting recognition product.

U.S. Pat. No. 4,829,583 to Monroe, et al., describes a system that uses an input tablet to accept strokes of an ideographic character. The user starts by writing the first and last stroke of the character. The system then identifies the character, based on the beginning and ending points of these strokes, quantized to a 9×9 grid. If the character cannot be uniquely identified based on these two strokes, a list of candidates will be displayed to the user for selection. In an alternative embodiment disclosed by Monroe et al., the user can enter specific additional strokes to disambiguate the character identification. These additional strokes can be the second and the penultimate stroke, the last stroke of a radical, or the stroke immediately after the radical.

There are serious limitations in the ease of use of the system disclosed in Monroe. These limitations stem from the primitive recognition algorithm used. Since the recognition algorithm is a lookup table, with no error correction disclosed, the user must start and end the particular stroke in the exact 9×9 grid element required by the system. If the user starts or ends the stroke in an adjacent square, the system will fail to recognize the character. The system disclosed in Monroe, et al. supplies a grid overlay on the input tablet to assist in the drawing of the strokes. However, users often cannot remember the exact starting or ending square for all strokes of all 5401 characters. Furthermore, if the input tablet is very small, as in a touchpad, it is difficult to exactly hit the correct grid square while writing rapidly. Being forced to start and end strokes in the exact grid square is an error-prone, uncomfortable process. If starting or ending a stroke in the correct square is a 95% successful process, then after two strokes, the probability of recognition is. $(0.95)^4=81\%$. If six strokes are required for recognition, then the probability of recognition with the Monroe et al. system is $(0.95)^{12}=54\%$. If the character is very complicated, and requires 18 strokes to disambiguate it from other characters, the probability of recognition is $(0.95)^{36}=16\%$.

Clearly, the system disclosed in Monroe, et al. must limit itself to recognizing characters with only a very few strokes. It is well known to those skilled in the art that the first and last strokes are the most informative for Chinese characters. Monroe et al. take advantage of this fact, and thus the user must start by writing the first and last strokes of the character, possibly followed by key strokes near the end of the radical.

However, being forced to write the first, then the last, then possibly some arbitrary stroke in the middle of the character is very non-intuitive and error prone. If the user starts writing strokes in the well-known correct stroke order, it can typically take 3 to 18 strokes before the character is disambiguated, due to many characters sharing the same initial radical, which can have as many as 17 strokes. As discussed above, the Monroe, et al. system will have unacceptably high error rates if the user writes in the well-known correct stroke order. In addition, forcing the user to write the character in a non-natural manner by forcing the entry of strokes in an order other than the order in which they would naturally be written, comprises a clumsy and non-optimal user interface.

It is an object of the present invention to create an incremental entry method for ideographic characters that allows users to write strokes in the well-known correct order, while still maintaining a high accuracy rate.

It is another object of the present invention to provide an ideographic character input method that is as intuitive as printing a character on a tablet.

It is a further object of the present invention to provide an ideographic character input method which is faster and more accurate than standard ideographic character recognition.

Yet another object of the present invention is to provide a method for using low-cost tablets without proximity detection or a display in order to enter ideographic characters.

It is another object of the present invention to provide an incremental ideographic character input method which overcomes some of the shortcomings of the prior art.

BRIEF DESCRIPTION OF THE INVENTION

The present invention is a user interface method for performing entry of ideographic characters into a computer. The method consists of the following steps. First, the user enters at least one stroke of an ideographic character on a tablet or touchpad. The strokes are written in the natural order in which the ideographic character would be written (hereinafter "natural stroke order"). A stroke list is initialized with these first stroke(s), and the stroke list is supplied to an incremental character recognizer, which produces a hypothesis list of candidate characters that contain these first stroke(s). The user then can select a correct character from among the candidate characters on the hypothesis list by pointing at the desired candidate character, or the user can write an additional stroke of the character if no candidate character is correct. This additional stroke is added to the stroke list, and the stroke list is supplied to the incremental character recognizer, which produces a new hypothesis list. The method continues to accept strokes until the user selects a hypothesis.

In addition, the user interface can accept commands from the user, which can be used to delete some or all strokes in the stroke list, stop the recognition process, or send other commands to the character recognizer, application, or operating system.

According to an alternative embodiment of the present invention, the user can alternate writing strokes in two different windows. With the act of writing a stroke in the other window, the user indicates that the first candidate in the candidate list for the stroke(s) written in the first window should be selected.

Selection of commands and character candidates is made easy by using a touchpad and placing the selection regions at the edges of the window. This placement allows the user to run his or her finger along the edge of the touchpad to highlight various commands or candidates. The user does not need to look at his or her finger but rather can feel the bezel of the touchpad to find the edge. Edge-placed commands enable the use of the touchpad as an effective ideographic input device, because the touchpad does not sense the proximity of a pen or finger, which normally hinders the utility of touchpads as absolute-mode pointing devices. Edge-placed commands enable the use of any input devices which do not have proximity sensing or a display mounted beneath the touchpad.

The incremental recognizer of the present invention is superior to the prior art, because it is based on statistical pattern classifiers, which can be used to create a much more accurate incremental recognition system. The first part of the incremental recognizer is a pre-classifier, which limits the character candidates from all possible character candidates to a much smaller group in order to speed up recognition. A detailed classifier then determines the identity of the partial or full character being written. There are two neural networks which make up a detailed classifier. The first network is a two-layer time-delay neural network, which is optimized for recognition of partial characters. The second network is a two-layer standard neural network, which is optimized to recognize complete characters. The outputs of the two networks are combined to produce a system which works well for both partial and complete characters. The output combination of the two networks is then sorted to produce a hypothesis list.

As a post-processing step, the incremental recognizer manipulates the hypothesis list. Characters that definitely have fewer strokes than the user has written are deleted from the hypothesis list. Characters that are subsets of other characters on the hypothesis list are either promoted towards the front of the list, or are inserted at the front of the list.

DETAILED DESCRIPTION OF A PREFERRED EMBODIMENT

Those of ordinary skill in the art will realize that the following description of the present invention is illustrative only and not in any way limiting. Other embodiments of the invention will readily suggest themselves to such skilled persons.

In the specification and claims herein, the phrase "natural stroke order" is used. When used in the specification and claims herein, this phrase shall mean the order in which the strokes of an ideographic character are normally written by people to whom the language is native.

In the specification and claims herein, the word "pen" is used. When used in the specification and claims herein, this word shall mean a position designating device that is sensed by the input tablet or touchpad. For a standard graphics tablet, this is a special stylus, while for a standard capacitive touchpad, this is a finger.

In the specification and claims herein, the phrase "statistical pattern classifier" is used. When used in the specification and claims herein, this phrase shall mean an apparatus that classifies input patterns into one of a plurality of classes, the parameters and/or structure of such a classifier being determined from the statistics of the input patterns. Examples of statistical pattern classifiers include neural networks, radial basis functions, classification and regression trees, parametric Bayesian classifiers, nearest neighbor classifiers, local parametric models, mixtures of experts, and polynomial classifiers. A statistical pattern classifier can also consist of a plurality of statistical pattern classifiers whose outputs are combined using a combination algorithm. Other examples of statistical pattern classifiers are obvious to those skilled in the art of pattern recognition.

Figure 1:
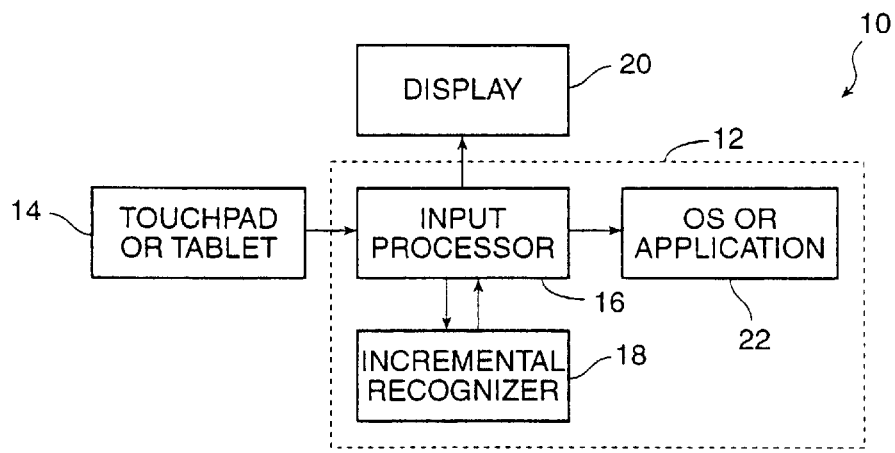
FIG. 1 is a block diagram of apparatus for implementing the incremental ideographic character input method of the present invention.

Referring first to FIG. 1, a block diagram illustrates an apparatus 10 for performing the ideographic character input method of the present invention. A user will interact with a computer 12 using a tablet or touchpad 14. According to a presently preferred embodiment of the invention, the user will employ a touchpad, because it has a small footprint (less than 4 inches square), so is easily integrated into a keyboard or portable computer. The output of the touchpad is processed by an input processor 16, which implements the method of the current invention. The input processor interacts with an incremental recognizer 18, draws graphics on a display 20, and sends character messages to the operating system or application 22. The input processor is typically implemented as software running on the computer 12.

Figure 2:
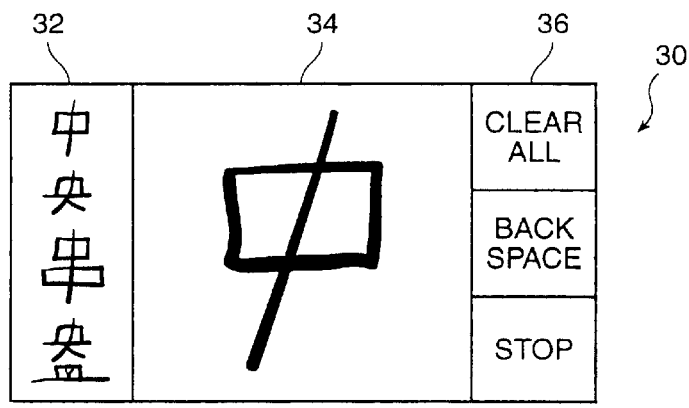
FIG. 2 is a diagram of a typical display window for use in the incremental ideographic character input method of the present invention.

Referring now to FIG. 2, a typical display window 30 of the input processor is shown. This window 30 can be a window in a standard windowing system, such as X windows or Windows 95. The window 30 is frequently a subset of the computer's display 20. A portion 32 of the window 30 is reserved for showing the hypotheses generated by the incremental recognizer. Another portion 34 of the window 30 shows the strokes written by the user so far. Yet another portion 36 shown on the right side of the window 30 is reserved for buttons by which the user can issue commands to the input processor.

According to the preferred embodiment of the invention, the absolute coordinate system of the touchpad 14 is mapped to the coordinate system of the window 30, and the window 30 has the same aspect ratio as the touchpad, so that the user can reach the entire window by touching anywhere in the touchpad. The arrangement of the regions 32, 34, and 36 shown in FIG. 2 are optimized for use with the touchpad, because selecting sub-regions within regions 34 and 36 simply require the user to run his or her finger along the vertical edges of the touchpad. Other arrangements of regions 32, 34, and 36 are possible within the scope of the present invention.

Figure 3:
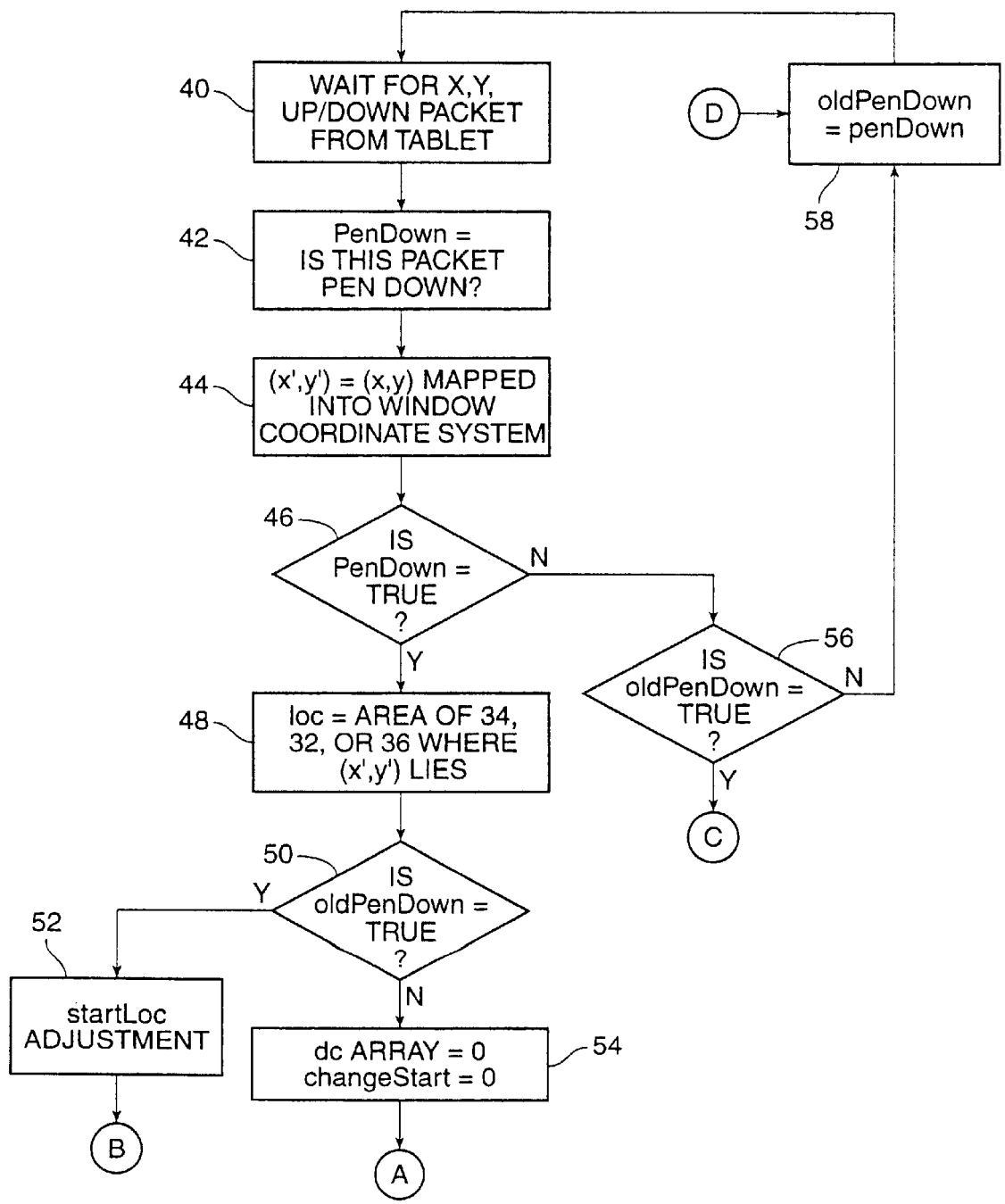
FIG. 3 is a flow diagram illustrating the initial steps performed by the input processor of the current invention.

Referring now to FIG. 3, a flow diagram illustrates the initial steps performed by the input processor 16 of the current invention. The touchpad input device 14 produces packets of data. The input processor 16 must handle these packets and respond appropriately to user intentions.

At step 40, the input processor waits for the next packet to arrive from the touchpad 14. According to a presently preferred embodiment of the invention, it is assumed that these packets are queued up by a separate thread of execution, so that the input processor does not need to have multiple threads of execution. Each packet has X and Y absolute location data from the touchpad, and a signal which indicates whether a pen (or finger) is in contact with the touchpad.

When a packet arrives to the input processor, step 42 is executed, which stores whether the pen is currently in contact with the touchpad in a variable, penDown. Step 44 is then executed, where the (X,Y) point on the touchpad is mapped to a (X',Y') point in the window 30 of FIG. 2. As discussed above, while the input processor is executing the steps of the present invention, the entire touchpad is mapped to the entire window, which has the same aspect ratio as the touchpad. Methods for mapping between rectangles with the same aspect ratio are well-known in the art. Alternative embodiments can include standard graphics tablets, where the tablet coordinate system is mapped to the entire extent of the display 20, as is well-known in the art.

After step 44, step 46 then decides whether penDown is TRUE. If it is true, then the input processor determines to which region (32, 34, or 36) the current packet maps. This determination is "hit-testing" and is well-known in the art. The region label is then stored in the loc variable at step 48. After step 48, step 50 examines the variable oldPenDown, which contains the value of the penDown variable for the previous packet. Upon program entry, the variable oldPenDown should be initialized to FALSE. If oldPenDown is TRUE, then step 52 is executed. Step 52 is further explained in FIG. 9. Then, control flows to FIG. 5, where standard pen down processing is performed.

Figure 6:
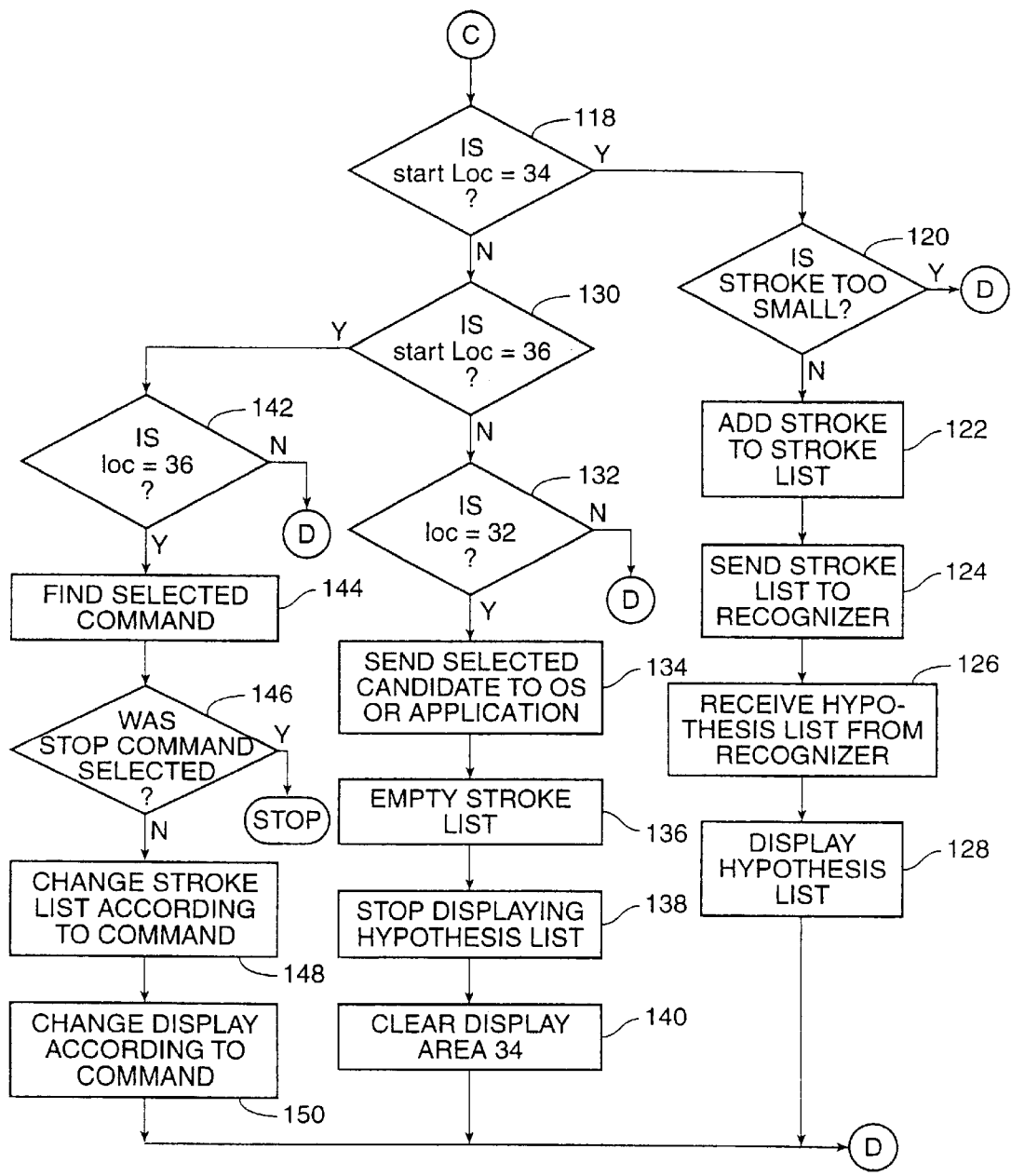
FIG. 6 is a flow diagram illustrating the steps that the input processor performs when the user lifts the pen or finger from the touchpad or tablet.

If oldPenDown is FALSE, then step 54 is executed, which initializes the startLoc adjustment algorithm in step 54 by initializing an array variable of length 3, dc, to 0 and initializing the variable changeStart to zero. Control then flows to an array variable of length 3, dc, to 0. Control then flows to FIG. 4, which describes initial pen down processing. If at step 46, penDown is FALSE, the processor then examines oldPenDown at step 56. If oldPenDown is also FALSE, the user is not interacting with the input processor, and the system updates oldPenDown with penDown at step 58, and control flows back to step 40. If oldPenDown is TRUE at step 56, the pen just went up and pen up processing occurs as shown in FIG. 6.

Figure 4:
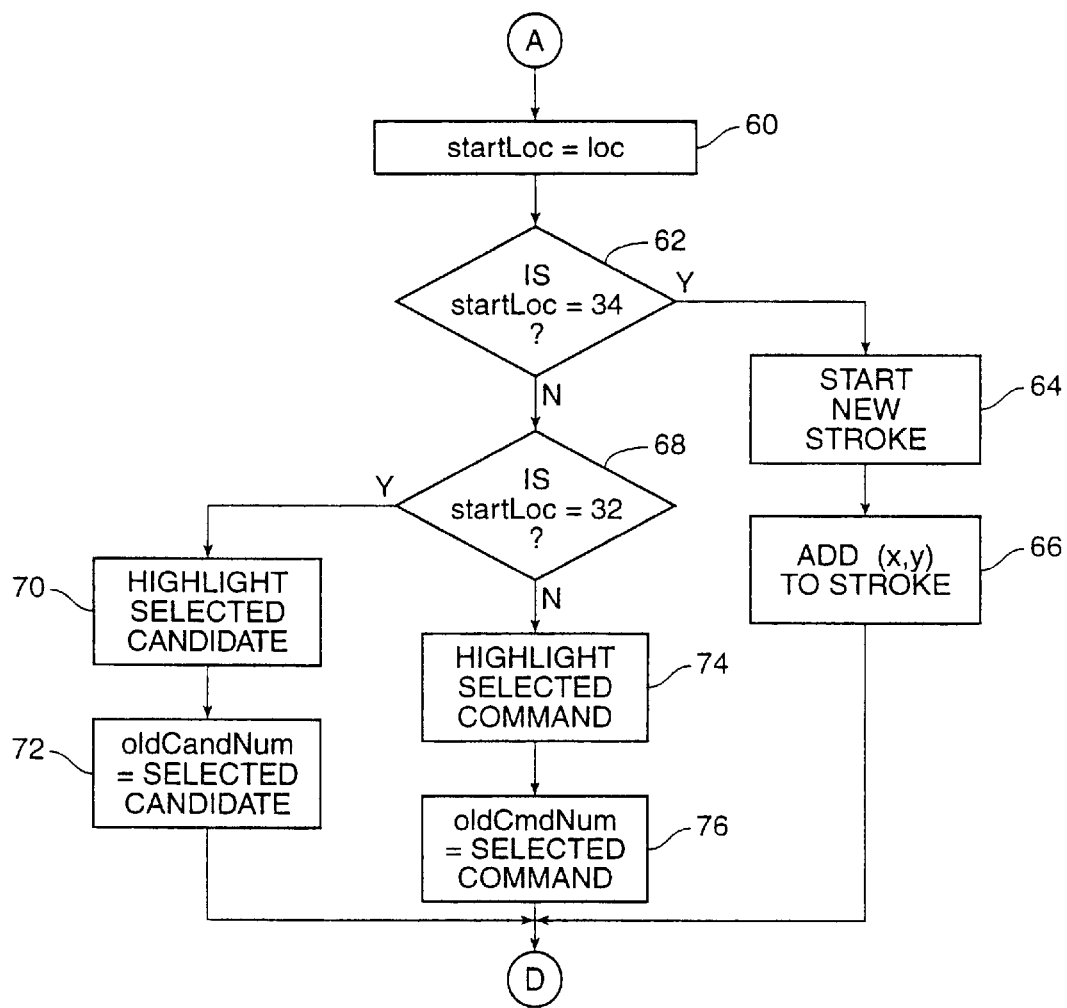
FIG. 4 is a flow diagram illustrating a presently preferred embodiment for initial pen or finger down processing according to the method of the present invention.

FIG. 4 illustrates a preferred embodiment of initial pen down processing according to the invention. The region to which the initial pen or finger down point gets mapped determines the behavior of the user interface. If the pen goes down in region 34, then the user wants to write another stroke. If the pen goes down in region 32, then the user wants to select a character candidate. If the pen goes down in region 36, then the user wants to enter a command. Alternatives to this embodiment can suggest themselves to those skilled in the art. For example, the user may be required to perform a tap gesture in areas on the touchpad corresponding to regions 34 or 36 in order to select a candidate or execute a command. FIG. 4 implements the preferred embodiment of merely starting the pen down in a region to indicate that an object will be selected from that region.

At step 60, the variable startLoc will be loaded with the label of the first pen down point, contained in the location variable "loc". The variable startLoc will serve as a mode flag throughout the user interface. At step 62, if startLoc is 34, then the user wants to write a new stroke and step 64 then allocates a new stroke and step 66 adds the current touchpad point (X,Y) to the stroke.

If startLoc is not 34, step 68 determines whether it is 32. If so, then the user wants to select a candidate. The input processor then executes step 70 to find the candidate whose graphical display contains the point (X',Y') and highlights that candidate. Other graphical interface actions, such as depressing a graphical button or changing the color of the candidate may be employed to indicate selection. The identity of the selected candidate is stored in the variable oldCandNum at step 72. If startLoc is not either 34 or 32, then the processor decides that the user wants to enter a command. The command whose graphical display contains the (X',Y') point is highlighted by step 74 and the identity of the selected command is stored in the variable oldCmdNum at step 76.

After steps 66, 72, or 76 are executed, control flows back to step 58 of the flow chart of FIG. 2, which prepares the processor to accept a new packet.

Figure 5:
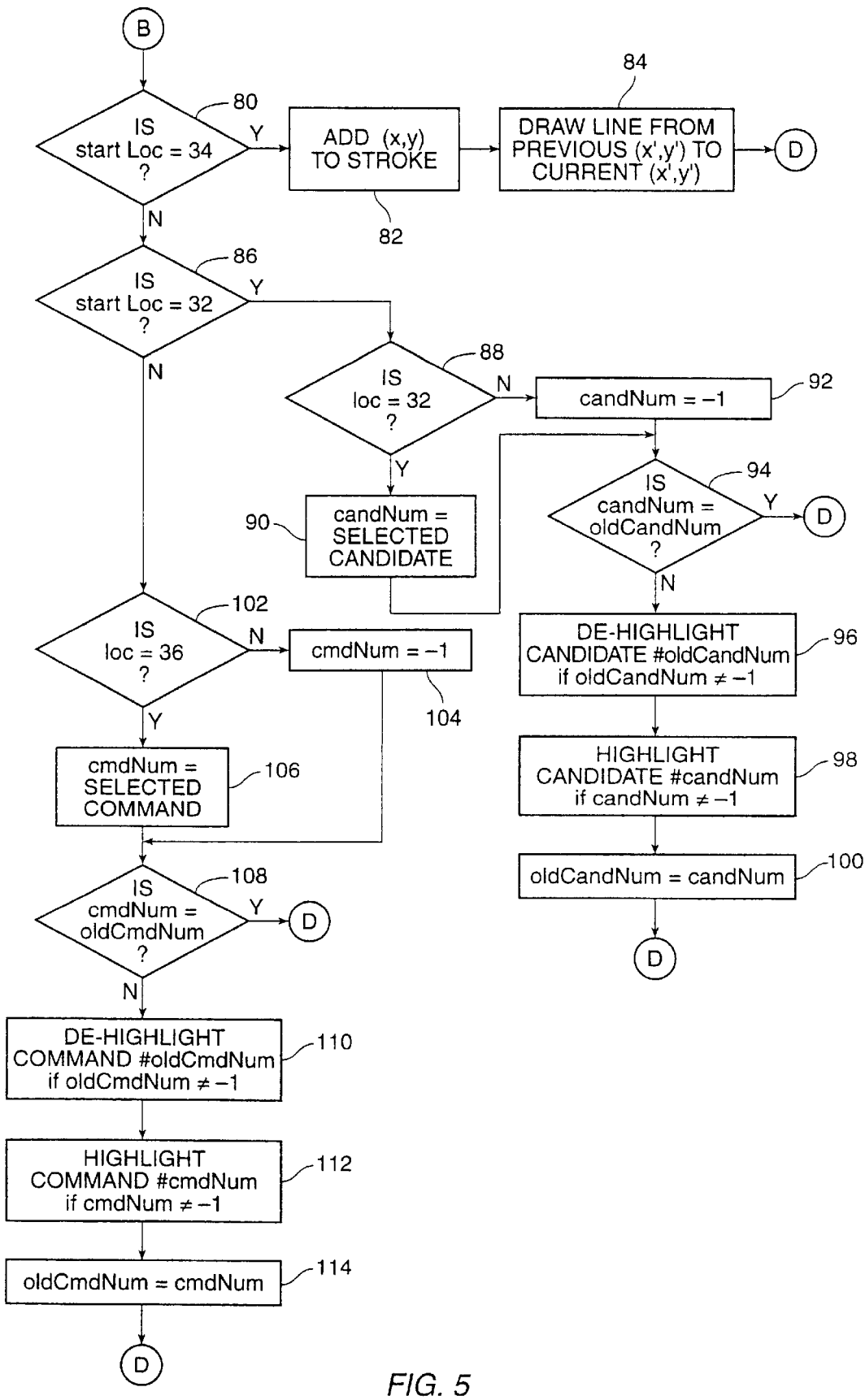
FIG. 5 is a flow diagram illustrating the processing steps performed by the method of the present invention during a pen or finger down interval, after the initial pen down point.

Referring now to FIG. 5, a flow chart illustrates the processing steps performed by the method during a pen down interval, after the initial pen down point. These steps will cause the stroke to be drawn or allow the user to slide the pen or finger along the right and left edge of the touchpad or tablet 14 to select different candidates or commands.

Step 80 determines whether the user is writing a stroke by determining if startLoc is 34. If so, the current (X,Y) point is added to the stroke at step 82, and a line is drawn on window 30 from the previous value of (X',Y') to the current value of (X',Y') at step 84. Control then flows back to step 58 of the flow chart of FIG. 2, which prepares the processor to accept a new packet.

If startLoc is not 34, step 86 checks to see if the user is selecting a candidate by determining if startLoc is 32. If so, step 88 determines if the user is still pressing on the candidate area of the touchpad by examining if loc is 32. If so, then step 90 sets the variable candNum to the identity of the candidate whose graphical display in window 30 of the display 20 contains the current (X',Y') position and control flows to step 94.

If loc is not in 32, the user is not trying to select a candidate, and the variable candNum is set to −1 at step 92. Step 94 then determines whether oldCandNum is the same as candNum. The purpose of step 94 is to minimize the number of graphical operations on window 30. If oldCandNum is the same as candNum, then no graphical operations need to occur, and control flows back to step 58 of FIG. 3.

If oldCandNum is different than candNum, then the candidate highlight must change. Step 96 de-highlights the candidate that corresponds to oldCandNum, if oldCandNum is not −1. Step 98 then highlights the candidate that corresponds to candNum, if candNum is not −1. Finally, step 100 updates oldCandNum with the current value of candNum, and control flows back to step 58 of FIG. 3.

At step 86, if startLoc is not 32, then the processor decides that the user must be selecting a command. At that point, steps 102 through 114 are executed. Steps 102 through 114 are exactly analogous to steps 88 through 100, except they manipulate the highlighting of commands, not candidates, and they operate on the variables oldCmdNum and cmdNum instead of oldCandNum and candNum. Thus, at step 102, it is decided whether startLoc is 36, which would indicate a command was intended. If, at step 102, it was decided that loc is not 36, a command is not intended, and step 104 then sets the variable cmdNum to −1. Control then flows to step 108.

If an intended command is indicated, step 106 then sets the variable cmdNum to the identity of the command whose graphical display in window 30 contains the current (X',Y') position. Step 108 then determines whether cmdNum is equal to oldCmdNum. If so, no further graphical processing is needed and control flows back to step 58 of FIG. 3.

If oldCmdNum is different than cmdNum, then the command highlighting must change. Step 110 de-highlights the candidate command that corresponds to oldCmdNum, if oldCmdNum is not set to −1. Step 112 then highlights the command that corresponds to cmdNum, if cmdNum is not set to −1. Finally, step 114 updates oldCmdNum with the current value of cmdNum, and control flows back to step 58 of FIG. 3.

Referring now to FIG. 6, a flow chart illustrates the steps that the input processor 16 of FIG. 1 takes when the user lifts the pen or finger from the touchpad or tablet 14. According to a presently preferred embodiment of the invention, a pen up is a signal to either send the strokes to the incremental recognizer, or to select a character or a command. As discussed above, alternative embodiments can also use different actions for selection. For example, by clicking on the left mouse button at any time, a user may indicate a selection of the first candidate on the list.

Step 118 first determines if the user is in the mode of entering strokes by examining whether startLoc is 34. If it is, step 120 determines whether the stroke is too small for processing. As is well-known in the handwriting recognition art, very small strokes can often be ignored as accidental strokes by the user. However, extreme care must be taken in recognizing ideographic characters, since some users write so quickly that their strokes become dramatically shortened. In the preferred embodiment of step 120, maximum of the stroke width and height are determined. If this maximum size is smaller than about 1 mil on the touchpad, then control flows to step 58 of FIG. 3.

If, at step 120, the stroke is not too small, step 122 adds the current stroke to a stroke list containing the strokes written so far. When the process is started, this stroke list is initialized to be empty. Step 124 sends the stroke list to an incremental recognizer 18, and, at step 126, a hypothesis list containing candidate characters is returned from the recognizer 18.

The incremental recognizer is a recognizer which is subject to several constraints. It is preferable that the incremental recognizer operate in less than 250 milliseconds, in order not to annoy the user with long delays between each stroke. Alternatively, the recognizer can take a longer amount of time to operate, if an optional interrupt is implemented. The incremental recognizer cannot use the total number of strokes in the character, nor can it use the total eventual size of the character, since neither of these pieces of information are available as the character is being written. The incremental recognizer can, however, use the number of strokes written so far and the size of the character written so far.

Dictionary-based recognizers (such as those described in U.S. Pat. No. 4,561,105 to Crane, et al.; U.S. Pat. No. 5,337,372 to LeCun, et al.; and U.S. Pat. No. 5,454,046 to Carman, II) may be suitable for use as incremental recognizers, because the dictionaries or reference patterns can be extended to include abbreviations of ideographic characters. In addition, incremental recognizers can be constructed by those of ordinary skill in the art using any number of statistical pattern classifiers, such as classification and regression trees, neural networks, or combinations of these elements. The present invention is a user interface to an incremental recognizer and does not depend on any particular recognition technology.

As an optimization, the incremental recognizer can save state regarding the input stroke list between invocations by the input processor. However, the input processor must have access to the stroke list, in order to add and delete strokes, as specified by the user.

As a further optimization, the incremental recognizer can be interrupted by the input processor during the recognition execution if the input processor 16 detects the arrival of a pen down packet. A pen down packet indicates that the user is attempting to either write a new stroke or select a command or candidate. In the preferred embodiment, the incremental recognizer interrupt is implemented in the thread of execution that is handling the queueing of packets at step 40. The queueing thread is separate from the thread that executes the input processor and the incremental recognizer. The queueing thread immediately operates on the packets as they come from the touchpad. The queueing thread writes the up/down state of the current packet to a memory location. While the thread that executes the input processor and the incremental recognizer is executing the incremental recognizer steps, it periodically checks this memory location. If the memory location indicates that the current packet is pen dawn while the incremental recognizer is being performed, the incremental recognizer aborts and control can immediately flow back to step 58 of FIG. 3. This interrupt assures that the graphical updates to window 30 is not slowed down by the processing of the incremental recognizer 18.

Interrupting the incremental recognizer implies that sometimes more than one stroke can be written by the user between the generation of character hypotheses. In an alternative embodiment, the incremental recognizer can always wait for more than one stroke to either start generating hypotheses or generate further hypotheses. This alternative embodiment is less preferred, because the character may be finished by the user before the incremental recognizer is invoked, which leads to extra user interface complications.

The output of the incremental recognizer received by the input processor at step 126 is one or more hypotheses of the identity of ideographic character the user is attempting to draw. Step 128 will then display the hypothesis list in region 32 of the window 30 of display 20, in order of decreasing confidence or likelihood. The hypotheses produced by the incremental recognizer should be easily displayed in region 32 and selected by a user using the touchpad 14. The requirement of easy display and selection typically limits the number of displayed hypotheses to less than fifteen as a matter of practicality. The incremental recognizer can produce more hypotheses than can fit into region 32, but step 128 then must truncate the hypothesis list to fit. After display, the system is ready to accept new input packets at step 58 of FIG. 3.

If, at step 118, startLoc is not 34, at step 130 the input processor determines whether startLoc is 36. If it is not, then it is determined that the user is selecting a character by lifting the pen in a region of the touchpad or tablet 14 corresponding to region 34 of window 30. Step 132 is then executed to determine whether the current position on the touchpad corresponds to the selection area 32 of window 30 of display 20. If it does not, then it is decided that the user is trying to abort the selection process by moving out of the selection area. Therefore, control flows back to step 58 of FIG. 3.

If the current position on the touchpad corresponds to the selection area 32 of window 30 of display 20, step 134 sends the candidate character corresponding to the value of the variable oldCandNum to the operating system or another application. According to a preferred embodiment of the invention which runs under Windows 95, the input processor 16 of FIG. 1 uses Input Method Editor messages to communicate with the operating system, as is well-known in the art.

After sending the candidate character in step 134, steps 136, 138, and 140 clean up the state of the input processor 16 in order to accept a new character. Step 136 empties the stroke list, step 138 stops the display of the hypothesis list, and step 140 clears the display area 34. Process control then flows back to step 58 of FIG. 3.

If, at step 130, startLoc is 36, then it is determined that the user is trying to select a command. Step 142 then determines whether the user is still pointing in the command selecting area. If not, then the user is trying to abort the command and control flows back to step 58 of FIG. 3. Otherwise, step 144 determines the command that corresponds to the value of the variable oldCmdNum. Step 146 then determines whether the stop command was selected. If so, then the input processor will exit, after performing suitable clean-up. According to a presently preferred embodiment, before the input processor exits, it places the touchpad into relative mode, so the user can manipulate the cursor with the standard mouse-emulation methods.

If the selected command was not a stop command, step 148 will change the stroke list according to the command. For example, if the command was "clear all", then the stroke list is emptied. If the command was "back space", the last stroke in the stroke list is deleted.

Step 150 will change the display in region 34 to reflect the changes to the stroke list in step 148. Process control then flows back to step 58 of FIG. 3.

As will be apparent to those skilled in the art, other commands may be placed on the command area. The "Clear All" and "Back space" commands are preferred commands for use in the system of the present invention, but other commands can be added. These other commands do not necessarily have to affect the stroke list or display, but can, for example send commands to the operating system or to the incremental recognizer. An example of another such command is the invocation of a phrase-completing dictionary, as is common in existing commercial ideographic character entry systems.

When no strokes have been entered into the system, there are no hypotheses to display in region 32 or select at step 144. In one embodiment, various common Chinese characters, English characters, or punctuation can be displayed as hypotheses when no strokes have been entered into the system. Examples of such hypotheses can be the space bar, the carriage return, a period, or a comma. Alternatively, these hypotheses can represent common radicals. If the user selects a common radical without writing any strokes, they are indicating that they wish to start the character with the selected radical. In the preferred embodiment of this alternative, a stored written example of the selected radical is inserted into the stroke list and processing continues at step 124, as if the stored strokes were entered by the user.

Figure 7:
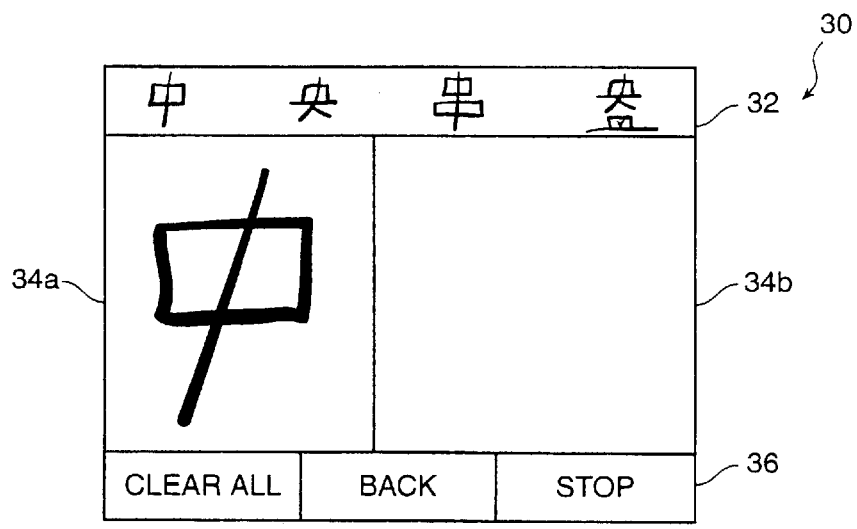
FIG. 7 is a diagram showing an alternate embodiment of the display window of the present invention, which is intended for experienced users.

Referring now to FIG. 7, an alternate embodiment of the graphics of the present invention is shown. The display window of FIG. 7 is intended for experts who are experienced with the system. Window 30 is now split into four regions. A strip across the top of window 30 is a region 32 in which character hypotheses are displayed. There are now two regions for stroke entry, 34a and 34b. A command strip 36 across the bottom of window 30 is for selecting commands.

If the user writes strokes in one area, then writes strokes in the other area without selecting a candidate or performing a command, then the input processor will automatically select the most probable candidate and send it to the operating system or the application. This user interface allows users to write characters in a continuous stream, without having to stop and select candidates. Other geometrical arrangements of regions 32, 34a, 34b, and 36 will suggest themselves to those skilled in the art, although the preferred embodiment is to have regions 32 and 36 against edges of the window 30 to facilitate ease of use with a touchpad.

Figure 8:
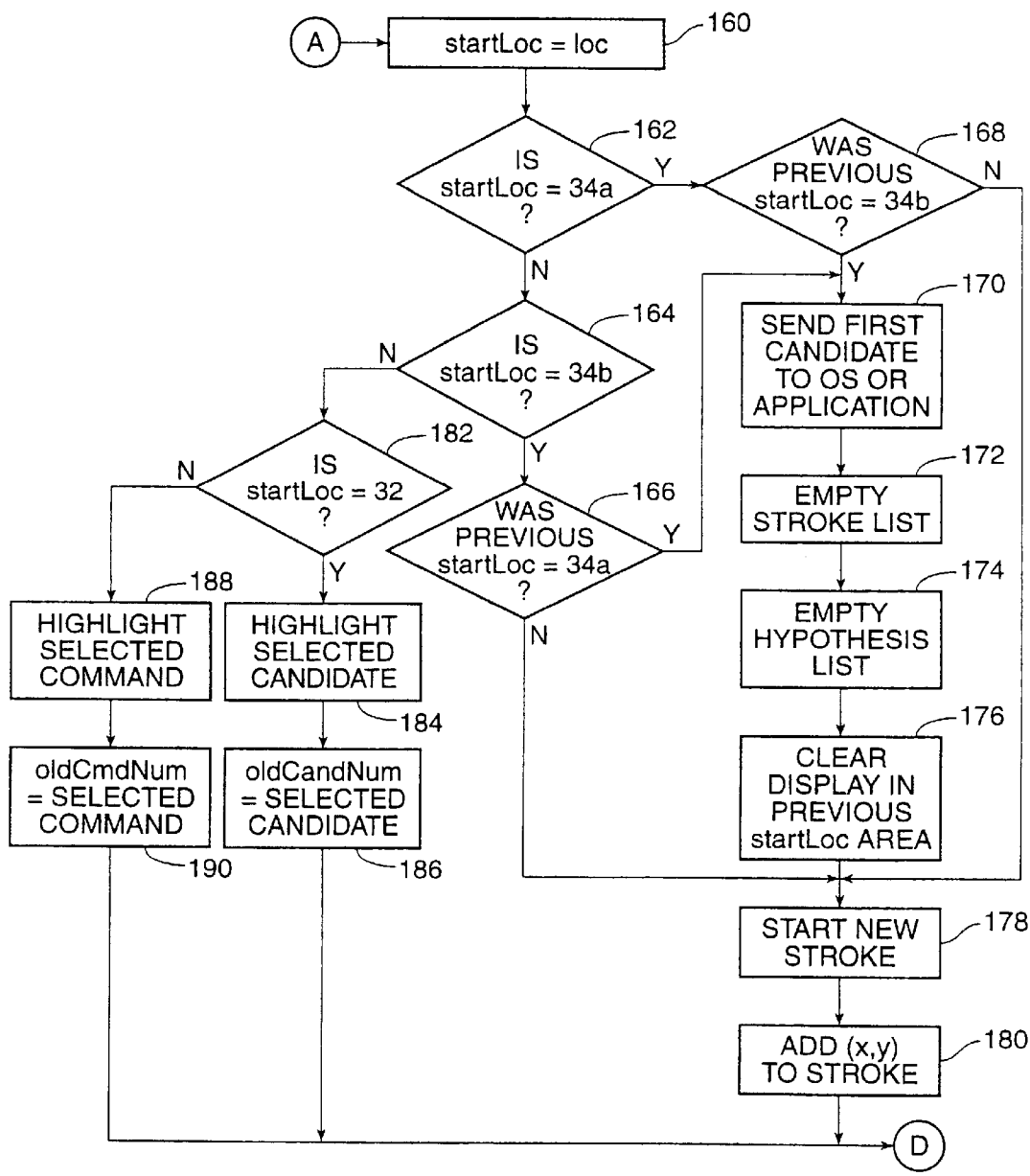
FIG. 8 is a flow diagram illustrating the steps that implement the user interface of FIG. 7.

FIG. 8 is a flow chart illustrating the steps for implementing the user interface shown in FIG. 7. The steps in FIG. 8 replace the steps in FIG. 4. The steps in FIG. 3, FIG. 5 and FIG. 6 are still used by the input processor when the user interface of FIG. 7 is employed. When the user interface of FIG. 7 is used, tests for startLoc being equal to 34 in FIG. 5 and FIG. 6 are true if startLoc is equal to either 34a or 34b.

Step 160 is performed exactly as step 60 in FIG. 4. After completion of step 160, steps 162, 164, 166, and 168 compute the following logical condition: Is (startLoc=34a AND previous startLoc=34b) OR (startLoc=34b AND previous startLoc=34a)? If so, then the user has moved from region 34a to region 34b, or visa versa, in window 30 of the display 20 and wants to select the best candidate by default. In this case, step 170 sends the best candidate to the application or operating system, and steps 172, 174, and 176 perform necessary clean-up steps in the same manner disclosed for steps 136, 138, and 140 of the process of FIG. 6.

If the logical condition is false and either startLoc=34a or startLoc=34b, or after step 176 is executed, then steps 178 and 180 are executed. These steps are performed as described for steps 64 and 66 of FIG. 4 are executed, which start a new stroke in the normal manner.

If, at step 164, startLoc is not 34a nor 34b, step 182 determines whether startLoc in 32, and hence whether a candidate or a command is being selected. If startLoc is 32, steps 184 and 186 are performed. These steps are the same as steps 70 and 72 of the process of FIG. 4 and are executed in the normal manner. After finishing steps 184 and 186 of the process of FIG. 8, process control flows back to step 58 of FIG. 3.

If it is determined at step 182 that startLoc is not 32, steps 188 and 190 are performed. These steps are the same as steps 74 and 76 of the process of FIG. 4 and are executed in the normal manner. After finishing steps 188 and 190 of the process of FIG. 8, process control flows back to step 58 of FIG. 3.

Figure 9:
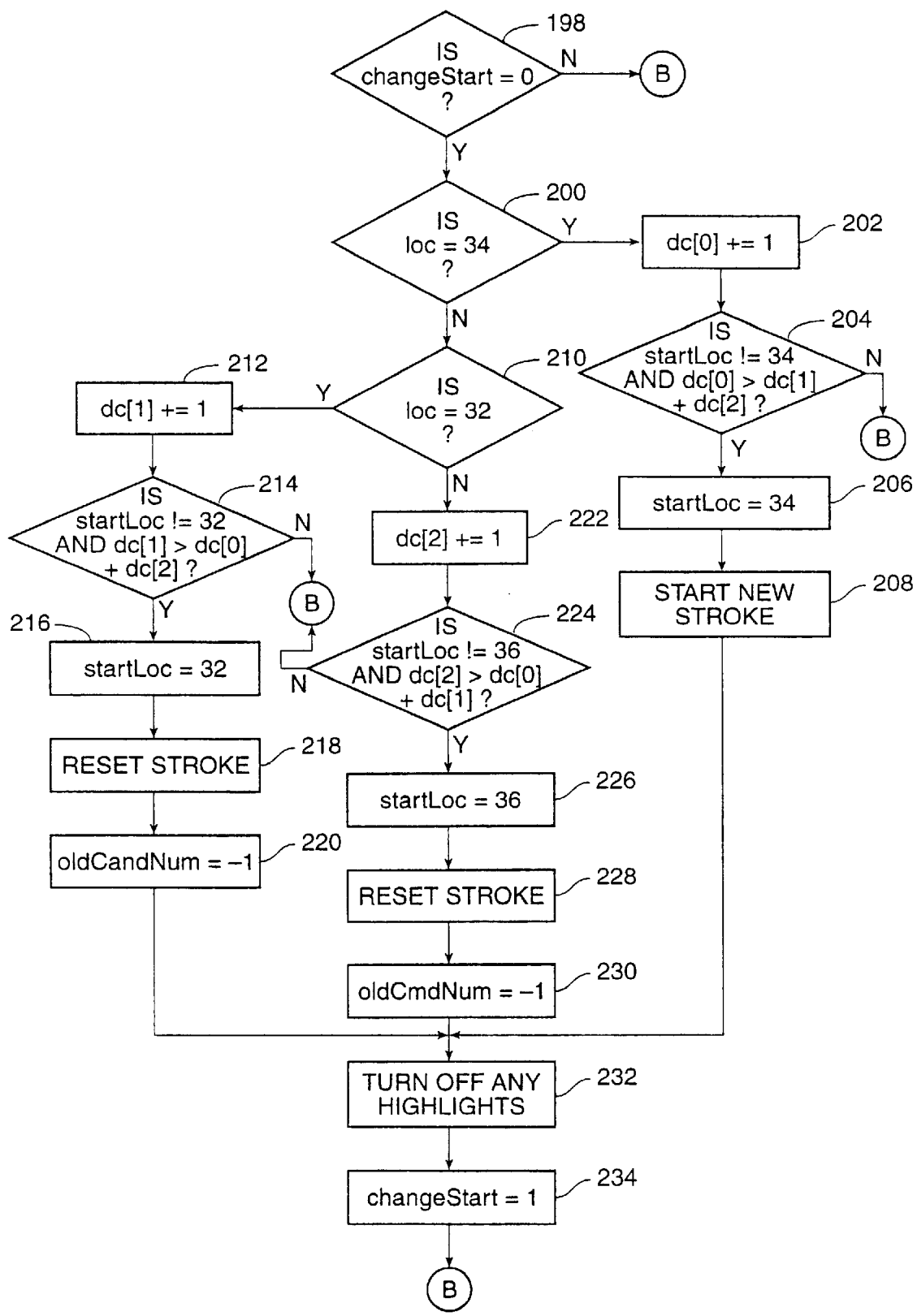
FIG. 9 is a flow diagram showing an optional enhancement to the user interface which is preferred when the input device is a touchpad.

FIG. 9 is a flow chart which illustrates an enhancement to the user interface that is preferred when the input device is a touchpad. Since the touchpad does not have proximity sensing, nor a integrated display, users can place their finger down in an incorrect location that does not correspond to the desired regions 32, 34, and 36. This can cause frustration in the user, who would, for example, want to select a candidate, not start a new stroke. The steps in FIG. 9 will attempt to heuristically determine which region the user meant to select by measuring the amount of time spent in all of the regions. If, during a pen down interval, the user spends more time pointing at one region than all of the others, then it can be assumed that the user intends to point at the region.

The steps in FIG. 9 are executed when the input processor executes step 32 in FIG. 3. Step 198 first determines whether startLoc has already been adjusted by examining the changeStart variable. In order to avoid confusing the user, startLoc is only modified a maximum of once per stroke. If changeStart is not zero, the algorithm has already changed startLoc and control flows back to step 58 of FIG. 3. Otherwise, step 200 then determines whether the current (X', Y') point falls into region 34 of window 30. If it does, then the counter dc[0], which measures the amount of time spent in region 34, gets incremented at step 202. Step 204 determines whether the initial down point was outside of region 34 and determines whether the amount of time spent in region 34 (dc[0]) exceeds the sum of the amount of time spent in region 32 (dc[1]) plus the amount of time spent in region 36 (dc[2]). If both of these conditions are true, then the user intends to draw a stroke, not select a command or candidate. Therefore, startLoc is reset to 34 at step 206 and a new stroke is started at step 208. If either condition is false, then process control flows back to step 80 of FIG. 5.

If step 200 determines that loc is not 34, then step 210 determines whether the current point falls into region 32. If it does, then steps 212 through 216 are performed analogously to steps 202 through 206, manipulating region 32 and dc[1] instead of region 34 and dc[0]. After step 216, step 218 resets the current stroke: if there is a current stroke, the contents of the stroke are discarded and the stroke is no longer displayed. Step 220 then sets the variable oldCandNum to −1, to force the highlighting of the new candidate in FIG. 5.

If, at step 210, loc is determined to not be 32, then the steps 222 through 226 are performed analogously to steps 202 through 206, manipulating region 36 and dc[2] instead of region 34 and dc[0]. After step 226, the current stroke is reset at step 228 and step 230 sets the variable oldCmdNum to −1, to force the highlighting of the new command in FIG. 5.

After steps 208, 220, or 230 are executed, all current highlights are turned off at step 232; and step 234 sets the changeStart variable to one, to indicate that startLoc has been changed. Process control then flows back to step 80 of FIG. 5.

Figure 10:
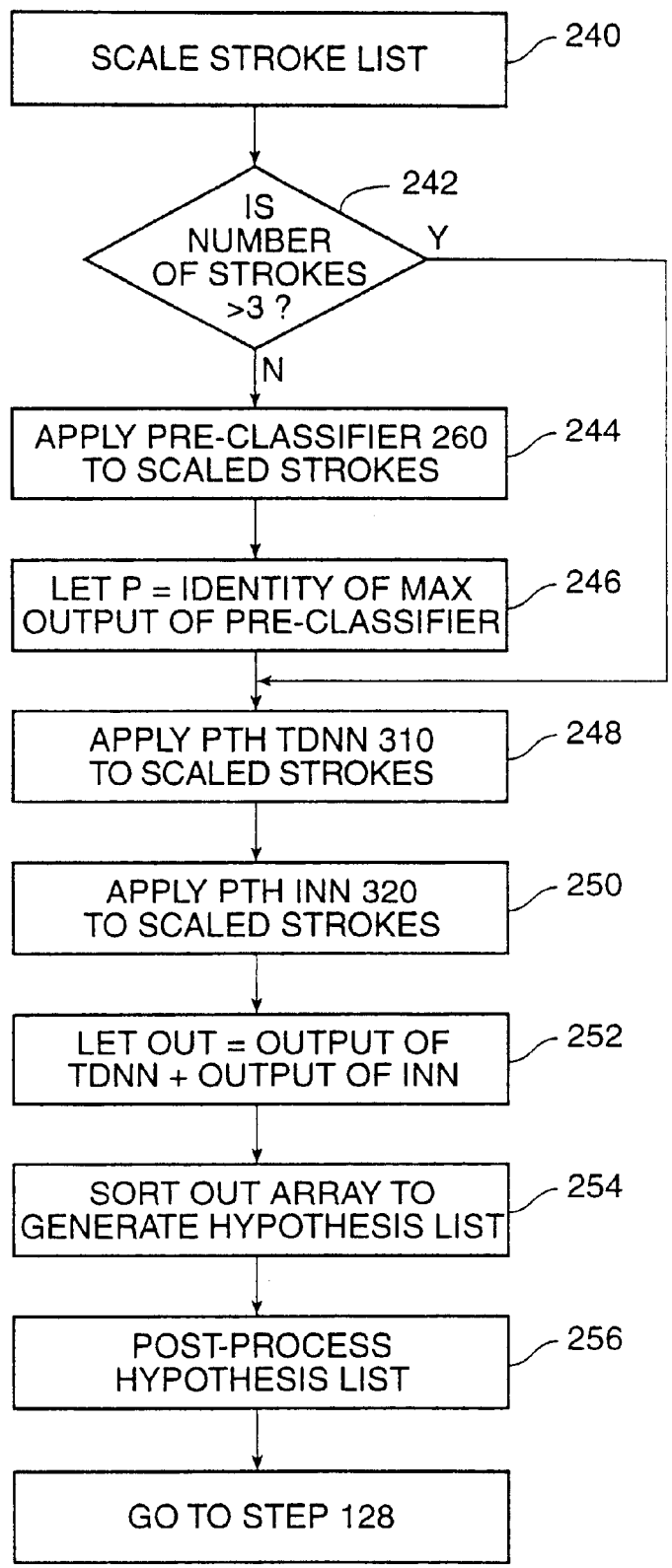
FIG. 10 is a flow chart which illustrates a presently preferred implementation of the incremental recognizer of FIG. 1.

FIG. 10 is a flow chart which illustrates the preferred embodiment of the implementation of the incremental recognizer 18 of FIG. 1. The function of the incremental recognizer 18 is to take a list of strokes which form a partial or completed character and create a list of hypotheses of the character's identity. According to the presently preferred embodiment of the invention, the incremental recognizer can create the hypothesis list from the 5401 most common traditional Chinese characters. Those of ordinary skill in the art will note that the incremental recognizer of the present invention can easily be extended to include more characters of the traditional Chinese character set, or to different character sets, such as the simplified Chinese character set, the kanji character set of Japan, or the Korean character set.

Choosing between thousands of character identities can be a computationally intensive task, even for modern personal computers. Since in the preferred embodiment of the present invention, it is desired to evaluate the incremental recognizer between every written stroke, the incremental recognizer must be fast. Therefore, the preferred embodiment recognizes the partial character in two stages. First the character set is divided into a set of possibly overlapping groups. According to a presently preferred embodiment of the invention, the 5401 characters are divided into 32 overlapping groups. A pre-classifier 260 determines to which of these groups the partial character is most likely to belong. A detailed classifier then creates a hypothesis list of most likely character identities from the members of the group.

The detailed classifier itself has two components: a neural network that is optimized for recognizing partial characters, and a neural network that is optimized for recognizing completed characters. It has been found that some users will stop before completing a character, while other users will continue until the end. By using the output of these two neural networks, both styles of users can be satisfied. It is believed that the use of neural networks to recognize partial characters, as well as the combination of these two types of neural networks is novel to this invention.

Turning now to FIG. 10, a flow diagram provides a detailed view of the operation of the incremental recognizer 18 of FIG. 1. First, step 240 scales the stroke list, so that the character lies in the box [0,1]×[0,1]. In the preferred embodiment, step 240 preserves the aspect ratio of the strokes, in order not to distort the partial character. More specifically, the stroke list is scaled in both dimensions equally, and translated. The result of this step is that the scaled strokes stretch from 0 to 1 along one of the x and y dimensions, and are centered in the [0,1] interval along the other axis. It is obvious to those skilled in the art how to create a software system that implements this scaling.

Step 242 determines whether the pre-classifier should be invoked, by determining whether the number of strokes is larger than three. In the preferred embodiment, the pre-classifier only examines the first three strokes, because the first three strokes almost always have enough information to limit the character hypotheses to a single group. As is obvious to those skilled in the art, more strokes can be supplied to the pre-classifier, but at greater computational cost. If step 242 determines that there are three or fewer strokes, step 244 applies the pre-classifier 260 to the scaled strokes.

Figure 11:
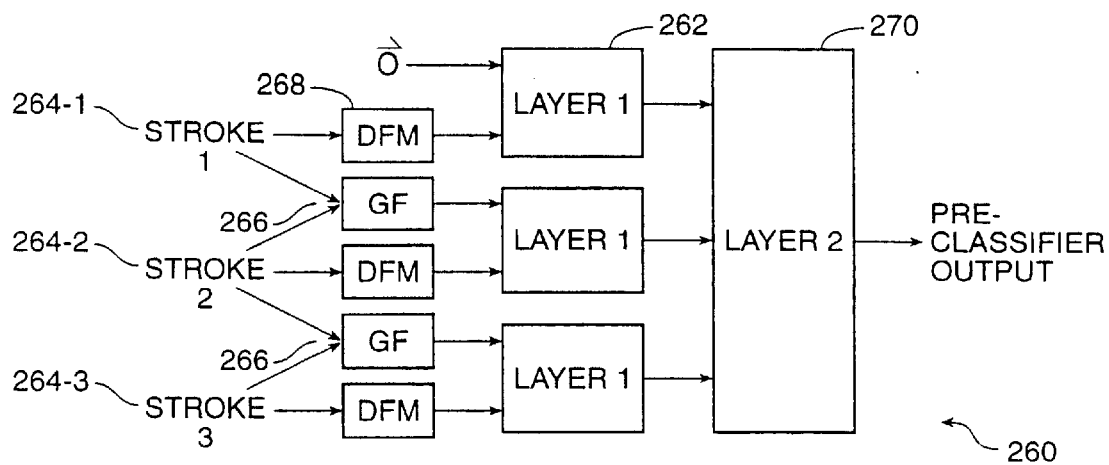
FIG. 11 is a block diagram of the architecture of a pre-classifier suitable for use in the present invention.

The structure of the pre-classifier is shown in FIG. 11 and its operation is described with reference to that drawing figure. In the preferred embodiment, the output of the pre-classifier is a vector of length 32, each element of which reflects the confidence that the partial character is a member of the corresponding group. Step 246 then determines the identity of the maximum output of the pre-classifier and stores it in the variable P. There exists an array of 32 detailed classifiers in the memory or on the disk of the computer. The pre-classifier determines that the Pth detailed classifier should be used to generate the hypothesis list.

As applied to recognizing entire characters, the use of a pre-classifier to restrict the search of a detailed classifier is well-known. For example, see the paper "Attributed String Matching by Split-and-Merge for On-Line Chinese Character Recognition" by Yih-Tay Tsay and Wen-Hsiang Tsai, in IEEE Transactions on Pattern Analysis and Machine Intelligence, vol. 15, no. 2, pp. 180–185, February 1993. However, the use of a pre-classifier to restrict the search for the identity of a partial character is believed to be novel to this invention.

Furthermore, it is well-known in the art that more than two steps of classification can be used to recognize ideographic characters. In other words, each detailed classifier itself could be comprised of a pre-classifier and a further plurality of detailed classifiers. For an example of prior art where more than two levels of classification are used, see the paper "On Speeding Candidate Selection in Handprinted Chinese Character Recognition" by T. Kumamoto, K. Toraichi, T. Horiuchi, K. Yamamoto and H. Yamada, in Pattern Recognition, vol. 24, no. 8, pp. 793–799, (1991). In the extreme case, the entire incremental recognizer could consist of a tree of classifiers, each one further limiting the possible list of candidates.

In the preferred embodiment, each detailed classifier consists of two neural networks: a time-delay neural network (TDNN) 310, and an image-based neural network (INN) 320. The TDNN 310 is optimized for recognizing partial characters. TDNNs are well-known in the art and are described in the paper "Phoneme Recognition using Time-Delay Neural Networks" by Waibel, Hanazawa, Hinton, Shiano, and Lang, in IEEE Transactions on Acoustics, Speech, and Signal Processing, March, 1989. The structure of the TDNN is described later herein.

Referring again to FIG. 10, step 248 applies the Pth TDNN to the scaled strokes to get an output vector which contains the confidence that the character identity of the list of strokes is a certain value. The length of this output vector varies with P. In the currently preferred embodiment, these lengths range from 22 to 538. The use of a TDNN to recognize partial ideographic characters is believed to be novel to this invention.

Figure 13:
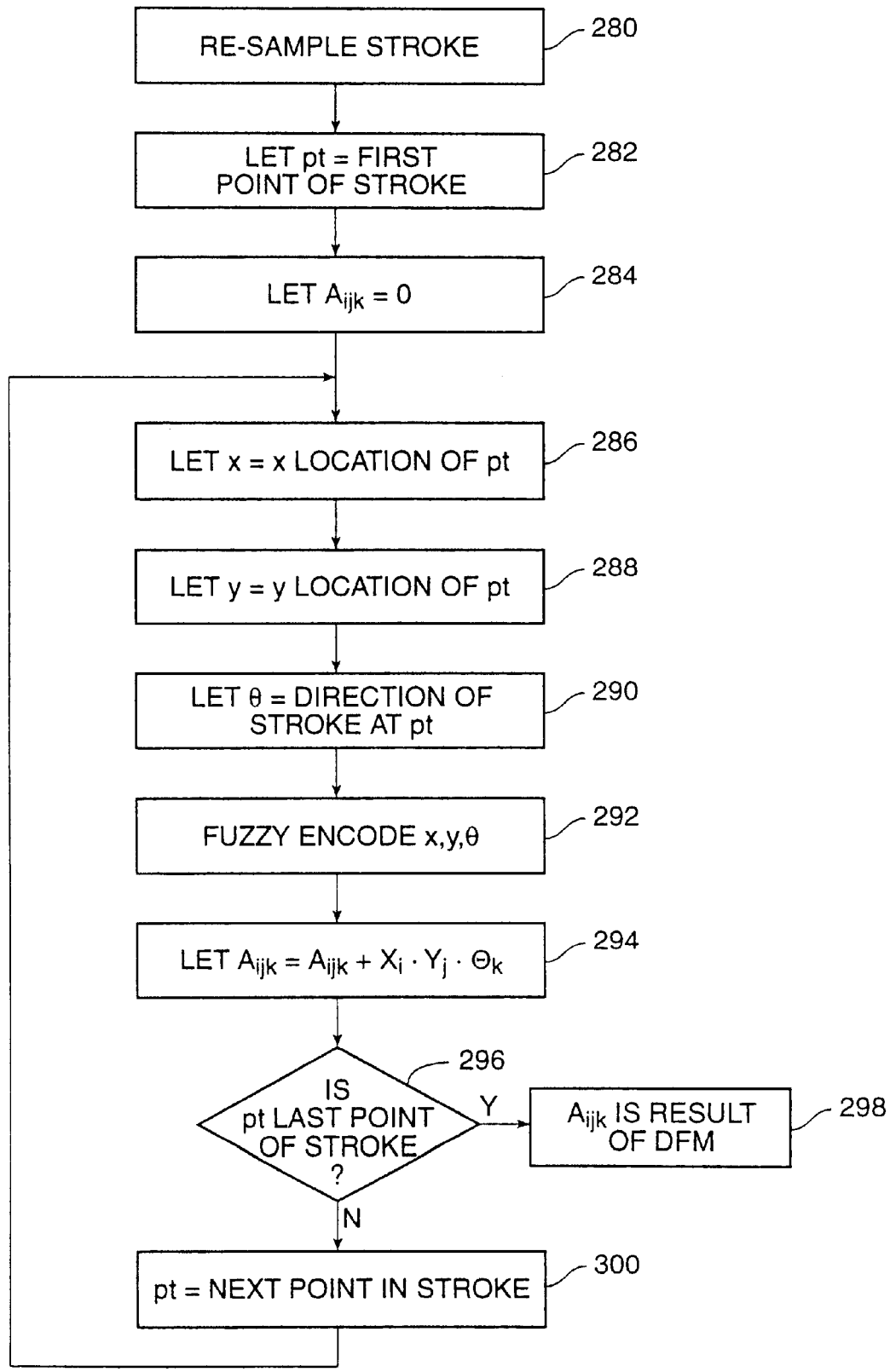
FIG. 13 is a flow chart which illustrates the operation of the Directional Feature Map (DFM) of the classifier of FIG. 11.

INN 320 is optimized for recognizing complete characters. The INN is a standard multi-layer neural network which uses image-based features. The structure of the INN is shown in FIG. 13 and will be described with reference thereto. Step 250 applies the Pth INN to the scaled strokes to get an output vector of confidences that are analogous to the output vector obtained from the TDNN. The INN output vector has the same length as the TDNN output vector. Steps 248 and 250 can be performed in either order.

Step 252 then sums the output vectors from the TDNN and the INN. Summing is the simplest method of combining neural network results, but those who are skilled in the art realize that more sophisticated techniques can be used, such as those described in the paper "Adaptive Mixtures of Local Experts" by Jacobs, Jordan, Nowlan, and Hinton, in Neural Computation vol 3, pp. 79–87, 1991.

Step 254 then sorts the summed output vector in descending order. The positions in the summed output vector correspond to character identities. Therefore, finding the position of the top N values in the summed output vector is equivalent to generating a hypothesis list of length N. As presently preferred, N is 10.

Step 256 then manipulates the hypothesis list according to various rules, in order to increase the chance that the first element in the hypothesis list is the correct answer. This post-processing consists of three steps that are individually described in FIG. 16, FIG. 17, and FIG. 18, respectively. Process control is then transferred to step 128 of FIG. 6.

The structure of a presently preferred embodiment of the pre-classifier is shown in FIG. 11. The pre-classifier 260 is a TDNN, where the first layer 262 of the TDNN is replicated across multiple inputs, as is well-known in the art. In prior art uses of a TDNN, each copy of the first layer 262 of a TDNN corresponds to a time slice of speech (see the paper by Waibel, et al.), or a small segment of handwriting (see U.S. Pat. No. 5,105,468 to Guyon, et al.). In the present invention, each copy of the first layer 262 corresponds to an entire stroke of an ideographic character. Each copy of the first layer 262 is connected to pre-processing that corresponds to one of the input strokes. It is believed that the use of a TDNN where each copy of the first layer corresponds to an entire stroke is a novel invention.

More specifically, each stroke 264-1 through 264-3 gets supplied separately to the pre-processing of-the TDNN. There are two pre-processing modules whose output gets supplied to each copy of the first layer 262. The first module is a Geometric Feature (GF) module, 266. The GF module 266 computes the geometric relationship between the beginning and ending points of the previous stroke and the beginning and ending points of the current stroke. For example, the uppermost GF module 266 computes the relationship between stroke 1 (264-1) and stroke 2 (264-2). The particular output of the GF module 266 is supplied to the copy of the first layer 262 that corresponds to stroke 2. The computation performed by the GF module 266 is described, below.

The GF module 266 uses the following four positions in its computations:
PB=first point of previous stroke
PE=last point of previous stroke
CB=first point of current stroke
CE=last point of current stroke The GF module 266 then computes the following four vector quantities:

D1=PB–CB; D2=PB–CE; D3=PE–CB; D4=PE–CE

Figure 12A:
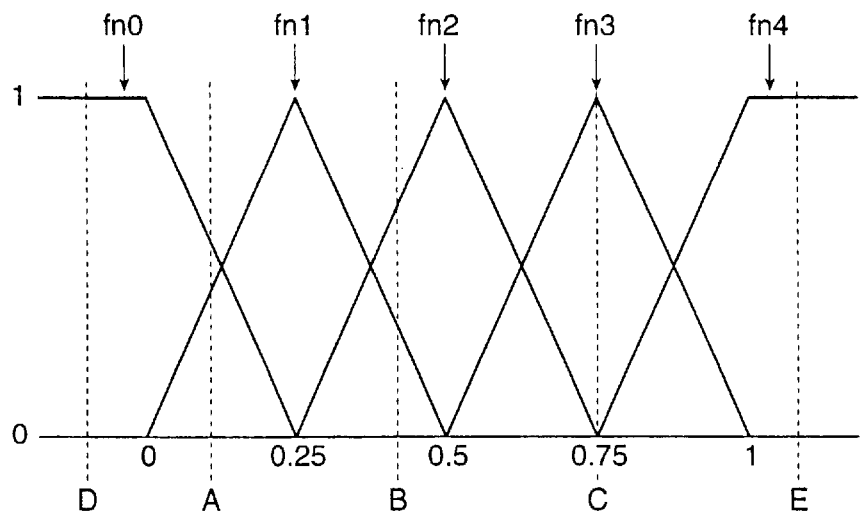
FIG. 12a is a diagram showing how a fuzzy encoding transforms a continuous scalar variable into a vector of fuzzy membership variables.

Each element of the four vector quantities then gets fuzzy encoded. The fuzzy encoding of input variables makes training the neural network much easier. A fuzzy encoding transforms original continuous scalar variables in some range into a vector of variable as shown in FIG. 12*a*. Each element of this vector represent a subrange of the variable. The value of each vector element is a measure of the match between the original variable and the center of the subrange. The encoding of continuous variables using fuzzy membership functions is known in the prior art and is described, for example, in "Neural Networks and Fuzzy Systems" by Bart Kosko, p. 27, Prentice-Hall (1991).

As an example of the fuzzy encoding illustrated in FIG. 12*a*, if a variable is to be encoded with 5 membership functions (fn0 through fn4) which encode the range [0,1], the 5 variables represent the closeness to the points {0.0, 0.25, 0.5, 0.75, 1.0}.

An original value of 0.1 (point A in FIG. 12*a*) would then produce a fuzzy encoding of 0.6, 0.4, 0, 0, and 0. An original value of 0.4 (point B in FIG. 12*a*) would then produce a fuzzy encoding of 0, 0.2, 0.8, 0, 0. Similarly, the original value of 0.75 (point C in FIG. 12*a*) would produce a fuzzy encoding of 0, 0, 0, 1, 0.

Original values that lie outside the fuzzy encoding range are encoded the same as the nearest extreme value of the range. This is shown by reference to points "D" and "E" on FIG. 12*a*. The value –0.2 (point D in FIG. 12*a*) becomes 1, 0, 0, 0, 0, while the value 1.4 (point E in FIG. 12*a*) becomes 0, 0, 0, 0, 1.

Software implementation of fuzzy encoding is obvious to those skilled in the art, from this description and prior references.

For the GF module 266, the each element of the two-dimensional vector variables D1 through D4 are encoded by eight fuzzy membership functions that evenly span the interval from –1 to 1. In other words, the membership functions are centered at {–1.0, –0.71, –0.43, –0.14, 0.14, 0.43, 0.71, 1.0}. A total of 64 outputs are thus produced by the GF module. Other resolutions and encoding ranges are possible.

The second pre-processing module is a Directional Feature Map (DFM) 268. The DFM takes the stroke and produces a three-dimensional tensor, which contains spatial information of where the stroke maintains a certain direction. DFMs have been described in the paper "Classification of Handprinted Chinese Characters Using Non-linear Normalization and Correlation Methods" by Jun Tsukumo and Haruhiko Tanaka, which appeared in pp. 168–171 in the Proceedings of the 9th International Conference on Pattern Recognition in Rome, 1988, IEEE Computer Society Press. DFMs are further described in detail in U.S. Pat. No. 5,337,372 to LeCun, et al., in FIG. 2 through FIG. 6. In the present invention, the processing steps performed in the DFM are illustrated in FIG. 13.

In FIG. 11, each first layer 262 is a standard neural network layer, with 80 output neurons in the preferred embodiment. The second layer 270 is a standard neural network layer. The second layer 270 accepts inputs from all three copies of the first layer 262, for a total of 240 inputs. The second layer 270 has 32 output neurons, each of which corresponds to a particular group of character identities and a particular TDNN and INN.

For purposes of this disclosure, a standard neural network layer performs the operations of multiplying a matrix of weights by an input vector, and taking the resulting vector and applying a sigmoidal non-linearity to it to yield an output vector. Such standard neural network layers are fully described in the standard textbook, "An Introduction to the Theory of Neural Computation" by J. Hertz, A. Krogh, and R. Palmer, Addison-Wesley, (1991), Chapter 6.

FIG. 13 is flow diagram which shows the steps performed in the DFM of the present invention applied to one stroke. Step 280 in FIG. 13 re-samples the stroke to provide a stroke with regular spacing between the points of the stroke. When the stroke is re-sampled, linear interpolation between the existing data points is used. Such a re-sampling step is well-known in the prior art through examples such as are found in U.S. Pat. No. 5,105,468 to Guyon, et al. Linear interpolation is well-known and is described in numerical analysis texts. See, e.g., Numerical Recipes in C, by Press, Vetterling, Teukolsky, and Flannery, 2nd edition, p 114, Cambridge University Press, (1992). As is presently preferred, the distance between each stroke example is 0.06.

After re-sampling, step 282 initializes the current point pt to be the first point in the re-sampled stroke. Step 284 then initializes a three-dimensional tensor variable A_ijk to be filled with zero. The main loop of the DFM starts with step 286, where the x variable is loaded with the x location of the current point pt and step 288, where the y variable is loaded with the y location of the current point pt. Then, step 290 determines the direction theta of the stroke at the current point pt. The determination of the direction of the current point is well-known in the art and is described in FIG. 7 of U.S. Pat. No. 5,105,468 to Guyon.

Figure 12B:
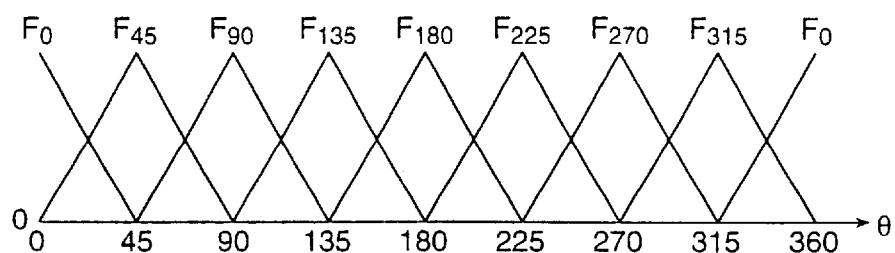
FIG. 12b is a diagram showing how a fuzzy encoding transforms a directional variable over the range 0 to 360 degrees into a vector of fuzzy membership variables.

Step 292 then produces fuzzy encoding of the x location, the y location, and the theta direction and places the encodings into the vector variables X_i, Y_j, and Theta_k respectively. According to a presently preferred embodiment, the locations x and y are encoded into five membership function that evenly span the interval from 0 to 1. The direction theta is encoded into eight membership functions which correspond to eight major directions: 0, 45, 90, 135, 180, 225, 270 and 315 degrees. These eight membership functions are shown in FIG. 12b as F_0, F_45, F_90, F_135, F_180, F_225, F_270, and F_315. The membership function at 0 degrees (F_0) is wrapped around, so that it is contiguous with the membership function at 315 degrees (F_315), as is shown in FIG. 12b. The wraparound of membership functions makes the fuzzy encoding of theta be a smooth function with no discontinuities.

Step 294 then forms a three-dimensional tensor by taking the outer product between X_i, Y_j, and Theta_k. This tensor is then summed into the variable A_ijk. Step 296 then completes the loop by determining whether the current point pt is the last point of the re-sampled stroke. If it is, then step 298 takes A_ijk as the result of the DFM. Otherwise, step 300 sets the current point pt to the next point on the stroke.

In the preferred embodiment, all 200 output values in the three-dimensional tensor of the DFM 268 are treated as a 200-element vector and supplied to a copy of the first layer 262.

It is obvious to those skilled in the art that the parameters of the DFM can be varied while still obeying the spirit of this invention. Such parameters can include the angular resolution, the spatial resolution, and the exact fuzzy membership functions used to create the DFM.

If fewer than three strokes are supplied to the pre-classifier 260, a sensible output is still desired. Therefore, the preferred embodiment signals the lack of an input to the first layer by not invoking any GF or DFM which has one or more missing input strokes. Instead, a vector of the correct length is filled with zero and supplied to the corresponding copy of the input layer 262. For the copy of the first layer 262 that corresponds to the first stroke, there never is a previous stroke to supply to the GF module 266. Hence, the GF module 266 is never called, and a vector filled with zero is always supplied to the first copy of the first layer 262.

The first layer 262 and the second layer 270 of preclassifier 260 are trained using the standard back-propagation algorithm as described in the standard textbook by J. Hertz, A. Krogh, and R. Palmer, in Chapter 6. As is well-known in the art of training a TDNN, there is only one stored set of first layer weights, which get updated by the gradients supplied by all three copies of the first layer. The training of a TDNN is described in the paper by Waibel, et al.

The training set of the pre-classifier 260 consists of multiple examples of the first three strokes of every character that the incremental recognizer should recognize. With standard on-line back-propagation, each example is supplied to the input of the pre-classifier and a desired output vector is supplied to the output of the pre-classifier and the weights of first layer 262 and second layer 270 are updated. The output that corresponds to the group to which the input example belongs is trained to be high. All other outputs are trained to be low. If a character has less than three total strokes, an example of the entire character is added to the training set.

The assignment of the characters to the desired groups are required for training the pre-classifier 260. The assignment of the 5401 characters to the 32 pre-classifier groups for the preferred embodiment is shown in Appendix A hereto. Each group has a label, then the characters belonging to the group are shown, then the number of characters in that group are shown. The assignment in Appendix A is not an automatic process. Characters that have similar first three strokes are manually clustered together into the same group. For a different character set or language, this manual grouping process must be performed again, before the pre-classifier can be trained. This manual grouping process is obvious to those skilled in the art.

As is obvious to those skilled in the art, the use of a two-layer TDNN with these feature sets is one structure that performs pre-classification. Other variations of the TDNN, such a network with more than two layers, or a TDNN with different feature sets would also form effective pre-classifiers. In general, a pre-classifier can be constructed by those of ordinary skill in the art using any standard statistical pattern classifier, such as classification and regression trees, neural networks, radial basis functions, or mixture of experts. The pre-classifier can also be constructed using a stroke matching algorithm. The invention does not depend on particular recognition technology. The pre-classifier itself can be composed of more than one module, including multiple feature detection and multiple recognizer sub-modules. The pre-classifier can also retain state between sequential calls of the incremental recognizer, in order to minimize the overall amount of computation.

Figure 14:
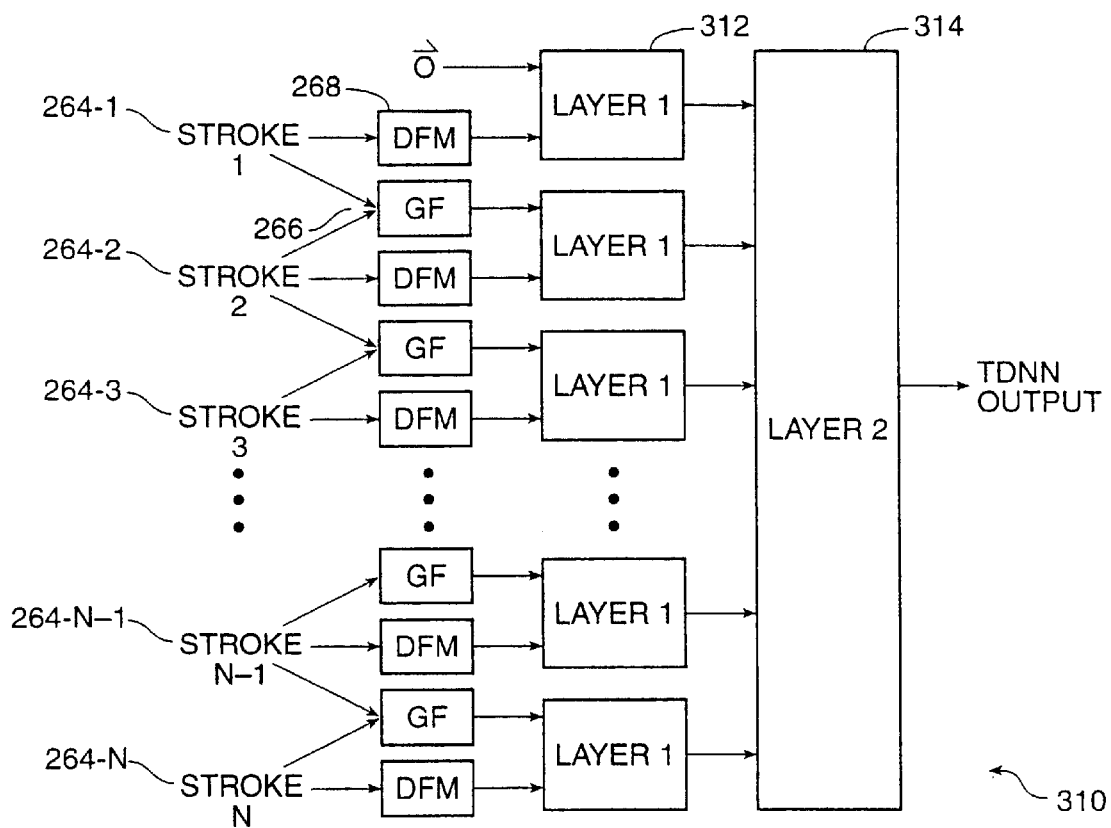
FIG. 14 is a block diagram showing the structure and organization of a time-delay neural network (TDNN) suitable for use in the present invention.

FIG. 14 is a block diagram showing the structure of the TDNN 310 used in the present invention as part of the detailed classifier. The structure of the TDNN 310 is very similar to the structure of the pre-classifier 260, except that the TDNN 310 accepts more than three strokes. According to a presently preferred embodiment of the invention, the TDNN 310 accepts up to 25 strokes. The DFM 268 and GF module 266 are the same as in the pre-classifier 260 of FIG. 11. As in the pre-classifier case, when there are not enough strokes to supply a particular DFM or GF, the outputs of that particular pre-processor are zero. In the preferred embodiment, the TDNN 310 contains 25 copies of a first layer 312 that is a standard neural network layer. The first layer 312 has different weights from the pre-classifier first layer 262. Each first layer 312 has 20 output neurons. The second layer 314, which is a standard neural network layer, receives inputs from all 25 copies of the first layer, for a total of 500 inputs. The number of outputs in the second layer of the Pth TDNN 310 is equal to the number of character identities in the Pth detailed classifier group. Every instance of the 32 different TDNNs have different first and second layer weights.

Training of the TDNN 310 is somewhat different than the training of the pre-classifier 260. According to a presently preferred embodiment, the training set consists of, for every character in the detailed classifier group, the stroke subsets whose stroke number ranges from three to the total number of strokes in the character. These training subsets start at the first stroke and contain the strokes in the order that the training subject wrote them. If a character has less than three strokes, a copy of the full character is added to the training set. In addition, an example of each entire character was added to the training set two extra times, in order to raise the probability of correct recognition for entire characters.

As an example, if a character example has five strokes, then five stroke subsets are added to the training set: the first through third strokes, the first through fourth strokes, and the first through fifth strokes repeated three times. Each stroke subset is labelled with the identity of the character from which it was drawn. The output corresponding to that identity is trained to be high, while all other outputs are trained to be low. Thus, the TDNN 310 is trained to identify all possible natural-order subsets with three or more strokes of the characters in the detailed classifier group.

The assignment of characters to the detailed classifier group is an automatic procedure once the pre-classifier group assignment has been made and the pre-classifier 260 has been trained. The first three strokes of every example in the training set for the entire character set is generated. Again, if there are fewer than three strokes in a character example, the entire character is used. The pre-classifier 260 is evaluated on every example in the generated set of a particular character and the maximum output identity M is recorded. For each character identity, if a value of M occurs more often than a threshold, that character identity is assigned to the Mth detailed classifier group. In the preferred embodiment, with a training set that consists of 40 examples of each character, the threshold is once. In this way, a character identity can be assigned to more than one detailed classifier group. The groups that the identity is assigned to will be the groups that the pre-classifier will tend to select when characters with this identity occur. In this way, pre-classifier errors are compensated by allowing more than one detailed classifier to recognize a character. The threshold for detailed classifier assignment is non-zero to ignore effects of poorly written characters in the training set.

Once the identities of the characters in the Mth detailed classifier group are fixed, the Mth TDNN 310 can be trained using standard back-propagation and the full training set for the Mth detailed classifier group described above.

Just as in the pre-classifier case, the use of a two-layer TDNN with DFM and GF features is one structure that performs detailed classification. Other variations of the TDNN, such a network with more than two layers, or a TDNN with different feature sets would also form effective detailed classifiers. In general, a detailed classifier can be constructed by those of ordinary skill in the art using any number of statistical pattern classifiers, such as classification and regression trees, neural networks, radial basis functions, mixture of experts. A detailed classifier can also use stroke matching. The invention does not depend on particular recognition technology. The TDNN can also retain state between sequential calls of the incremental recognizer, in order to minimize the overall amount of computation. Other speed optimizations of the TDNN, such as using sparse matrix-vector multiplication, are obvious to those skilled in the art.

Figure 15:
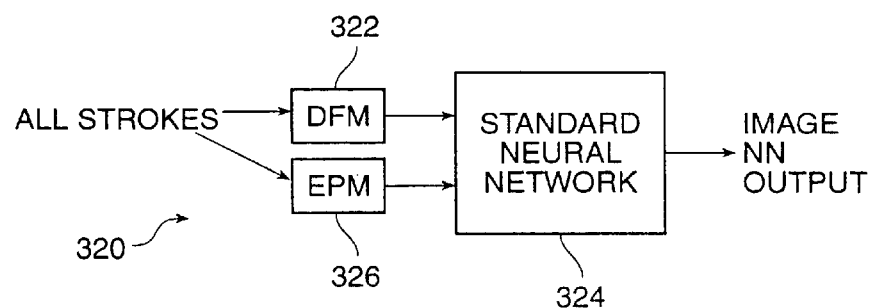
FIG. 15 is a block diagram showing the structure and organization of an image-based neural network (INN) suitable for use in the present invention.

FIG. 15 shows the structure of the INN 320, which is optimized to recognize complete characters. The INN also assists in the recognition of characters that are written in an order that is not the natural stroke order and in the recognition of cursive characters. All of the strokes in the scaled stroke list are supplied to the INN. There are two feature sets that are computed for the INN. First, a DFM 322 is computed. The DFM 322 has different parameters than the DFM 268 of FIG. 11. The DFM 322 produces a 5 by 8 by 8 tensor. The DFM uses five membership functions for encoding directions: F_45, F_0, F_315, F_270, and F_225. Rare points on strokes that have directions that lie outside these membership functions are ignored to reduce the size of the INN 320. The 8 by 8 resolution still covers the square [0–1]–[0–1]. The increased spatial resolution of the DFM 322 is necessary because all of the strokes are being supplied, not just one stroke. The output of the all-stroke DFM 322 is simply the sum of the outputs of the steps in FIG. 13 applied to each individual input stroke. All 320 pixels in the DFM output are supplied to the standard neural network 324 as a single vector.

The EPM pre-processing module 326 supplies information about the location of the endpoints of the strokes to the neural network 324. For each first and last point of every stroke, the EPM 326 produces a fuzzy encoding of the X and Y location of these points: X_i and Y_i. According to the presently preferred embodiment, each of these fuzzy encodings are produced by five membership functions evenly spanning the interval from 0.0 to 1.0. As a next step, the EPM 326 forms an image B_ij for every first and last point by taking the outer product between the X fuzzy encodings and the Y fuzzy encodings:

$$B_{ij} = X_i * Y_j$$

The EPM 326 then sums the B_ij for all of the first and last points and transmits these summed values to the neural network 324. In the preferred embodiment, there are 25 output values that get treated as a vector.

According to a presently preferred embodiment of the invention, the standard neural network 324 comprises two standard neural network layers, with 375 inputs, 200 hidden units, and the same number of outputs as the corresponding TDNN 310. The INN 320 is trained via standard back-propagation. The examples in the training set for the Mth INN is the same as the examples in the training set for the Mth TDNN. For the stroke subsets that contain all of the strokes for a character, the output that corresponds to the identity of the character is trained to be high, while all other outputs are trained to be low. For all other stroke subsets that contain partial characters, all of the outputs are trained to be off. Therefore,.the INN is trained to only respond to complete characters and not to add a significant output signal when the character is not complete.

Similar to the TDNN, every instance of the 32 different INNs have different weights in the neural network 324. The standard neural network 324 can be optimized in ways that are well-known in the art, using sparse matrix-vector multiplication.

Figure 16:
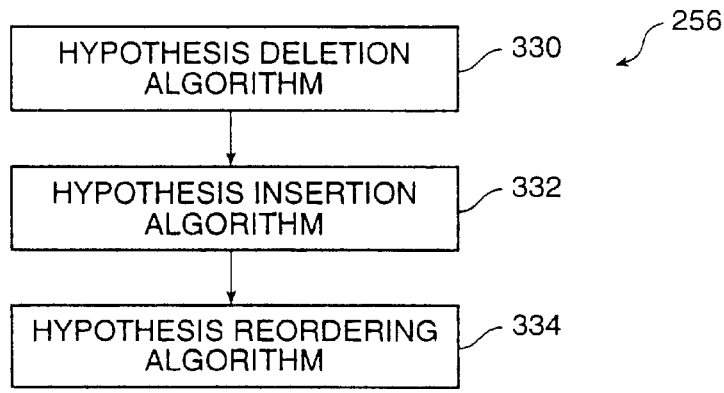
FIG. 16 is a flow diagram illustrating manipulation of the hypothesis list in order to increase the chance that the first element in the hypothesis list is the correct answer.

Step 256 of FIG. 10 is a step which post-processes the hypothesis list. In the preferred embodiment, there are three post-processing steps that comprise step 256, as shown in FIG. 16, although those skilled in the art can imagine other possibilities. These post-processing steps consist of a hypothesis deletion algorithm at step 330, a hypothesis insertion algorithm at step 332, and a hypothesis re-ordering algorithm at step 334.

Figure 17:
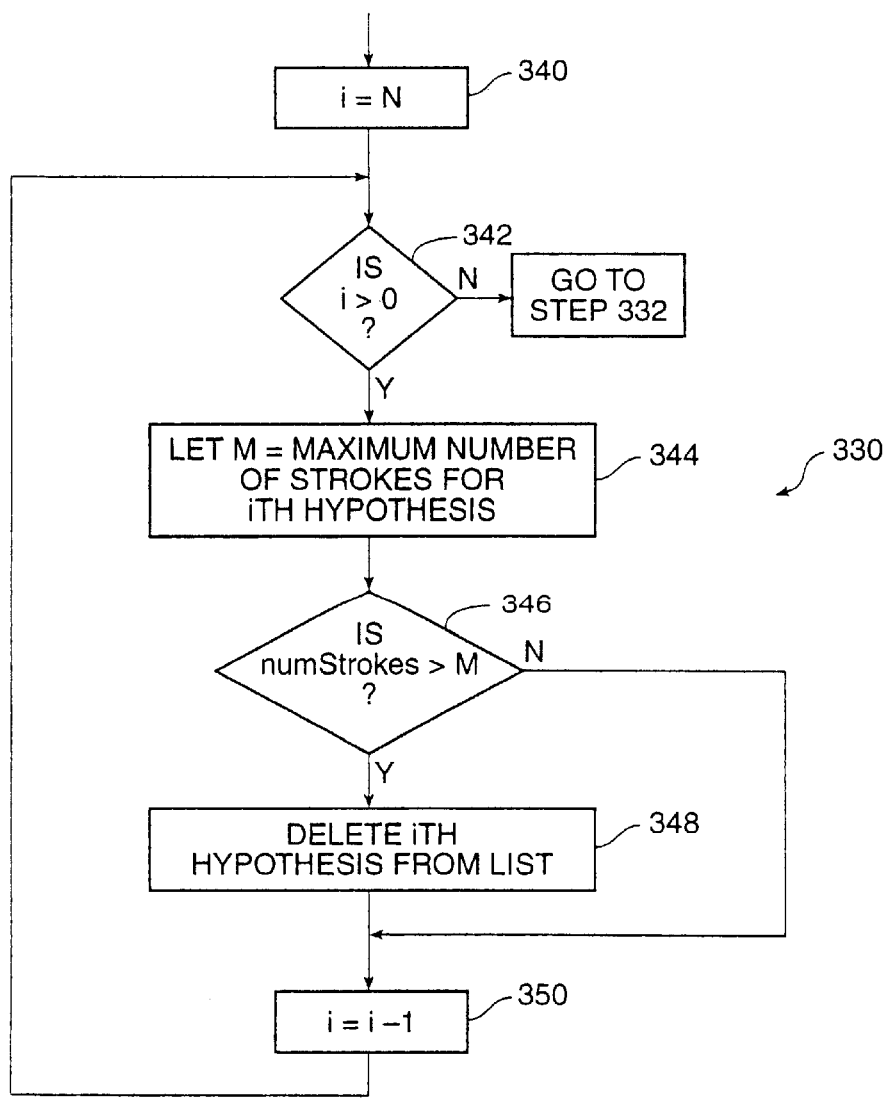
FIG. 17 is a flow diagram which shows the steps in the preferred embodiment of the hypothesis deletion algorithm of FIG. 16.

FIG. 17 is a flow diagram which shows the steps in the preferred embodiment of the hypothesis deletion algorithm 330. The purpose of the hypothesis deletion algorithm is to delete hypotheses that have too few strokes, compared to the number of strokes written so far in the partial character. For example, if the user writes 8 strokes, the incremental recognizer can safely delete hypotheses that are reasonably guaranteed to have 7 or fewer strokes. The hypothesis deletion algorithm requires an array of data which is the maximum number of strokes that an hypothesis may have. This array is derived empirically from the training set. Each element of the array is derived by finding the maximum number of strokes for all examples of a particular character identity. It is obvious to those skilled in the art that other criteria for hypothesis deletion can be used.

In FIG. 16, step 330 of FIG. 15 starts at step 340, where the counter variable i is set to the number of hypotheses N, which in the preferred embodiment is 20. Control then flows to step 342, which checks to see if the counter variable is still larger than 0. If it is not, then all of the hypotheses have been processed and control can then flow to the hypothesis insertion algorithm at step 332 of FIG. 16, described in more detail in FIG. 18.

Step 344 determines M, the maximum number of strokes for the identity of the ith hypothesis. Step 346 then checks to see if the variable M is smaller than the variable numStrokes, which is the total number of strokes written by the user in the current partial character. If numStrokes exceeds M, then step 348 deletes the ith hypothesis from the hypothesis list. In any event, control flows to step 350, where the counter variable i is decremented, so that the next hypothesis will be considered.

It will be apparent to those skilled in the art that there are many different ways of implementing the hypothesis deletion algorithm in software. The algorithm shown in FIG. 17 is exemplary, and such skilled persons will realize that the present invention is not limited to embodiments which implement the hypothesis deletion algorithm in the manner disclosed herein.

Figure 18:
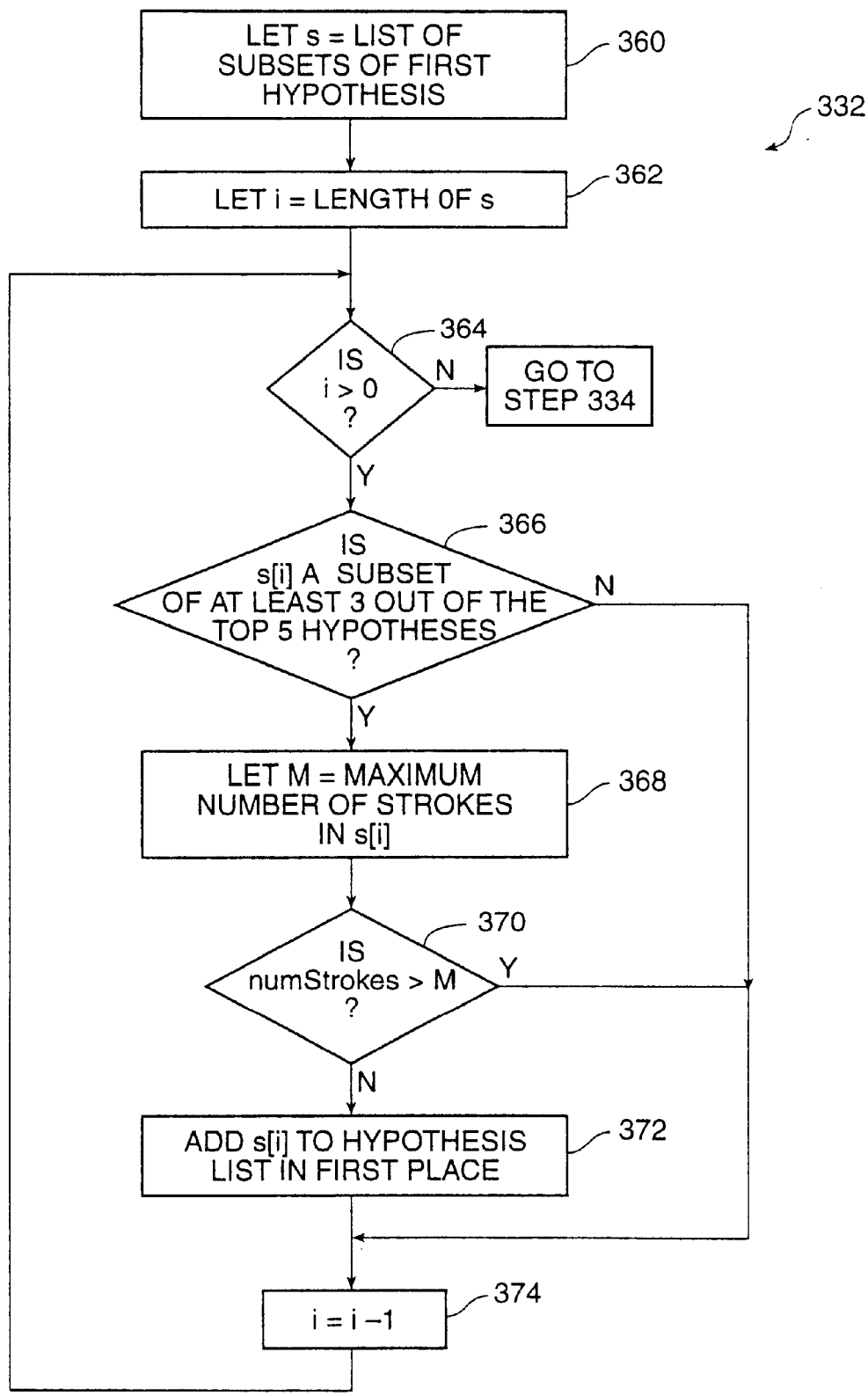
FIG. 18 is a flow diagram which shows the steps in the preferred embodiment of the hypothesis insertion algorithm of FIG. 16.

The hypothesis insertion algorithm 332 of FIG. 16 is shown in detail in the flow diagram of FIG. 18. The hypothesis insertion algorithm is used to insert hypotheses which are strict subsets of other hypotheses on the hypothesis list. Many ideographic characters are subsets of one another. That is, the user can form a character by writing a certain number of strokes, then form a different character by adding more strokes. If the user writes a character that is a subset of another character, the incremental recognizer may produce a hypothesis list that contains the more complex character, but not the simpler subset character. This situation can arise because many complex characters and the simpler subset character can have similar confidences when the subset character is presented to the incremental recognizer. The hypothesis list may not be long enough to contain the subset character, so it gets left off.

It is important that the incremental recognizer prominently display the subset character when all of the strokes of the subset character are entered into the system, because the user has no other way to enter the subset character. Therefore, the hypothesis insertion algorithm attempts to insert a subset character as the first hypothesis when it detects many hypotheses that contain that subset.

The hypothesis insertion algorithm requires a table which is indexed by character identity. Each entry in the table is a list of characters which are subsets of the character that is being indexed.

The detailed hypothesis insertion algorithm of FIG. 18 begins at step 360, where the variable s will contain the list of subsets of the first (i.e., best) hypothesis, taken from the subset table. Step 362 determines the length of this list and stores it in a counter variable, i. Step 364 then determines whether the counter variable is greater than zero. If not, then the hypothesis insertion algorithm is finished and control can then flow to the hypothesis re-ordering algorithm (step 334 of FIG. 16).

If the counter is greater than 0, then the ith entry in the list s is examined at step 366 to determine if s[i] is a subset of at least 3 of the top 5 hypotheses. This rule was determined empirically: other similar rules may be constructed by those skilled in the art. If s[i] is a common subset, then control flows to step 368, where the variable M is loaded with the maximum number of strokes for the character s[i].

Step 370 determines whether the current number of strokes entered as a partial character is greater than M. If not, then s[i] is added to the hypothesis list in first place at step 372. If the current number of strokes entered as a partial character is greater than M, or if the decision in step 366 was that s[i] was not a subset of at least 3 out of the 5 top hypotheses, then the subset should not be displayed and the variable i is decremented in step 374. Process control then returns to step 364 where it is again determined if i>0.

It will be apparent to those of ordinary skill in the art that there are many different ways of implementing the hypothesis insertion algorithm in software. The algorithm shown in FIG. 18 is exemplary, and such skilled persons will realize that the present invention is not limited to embodiments which implement the hypothesis insertion algorithm in the manner disclosed herein.

Figure 19:
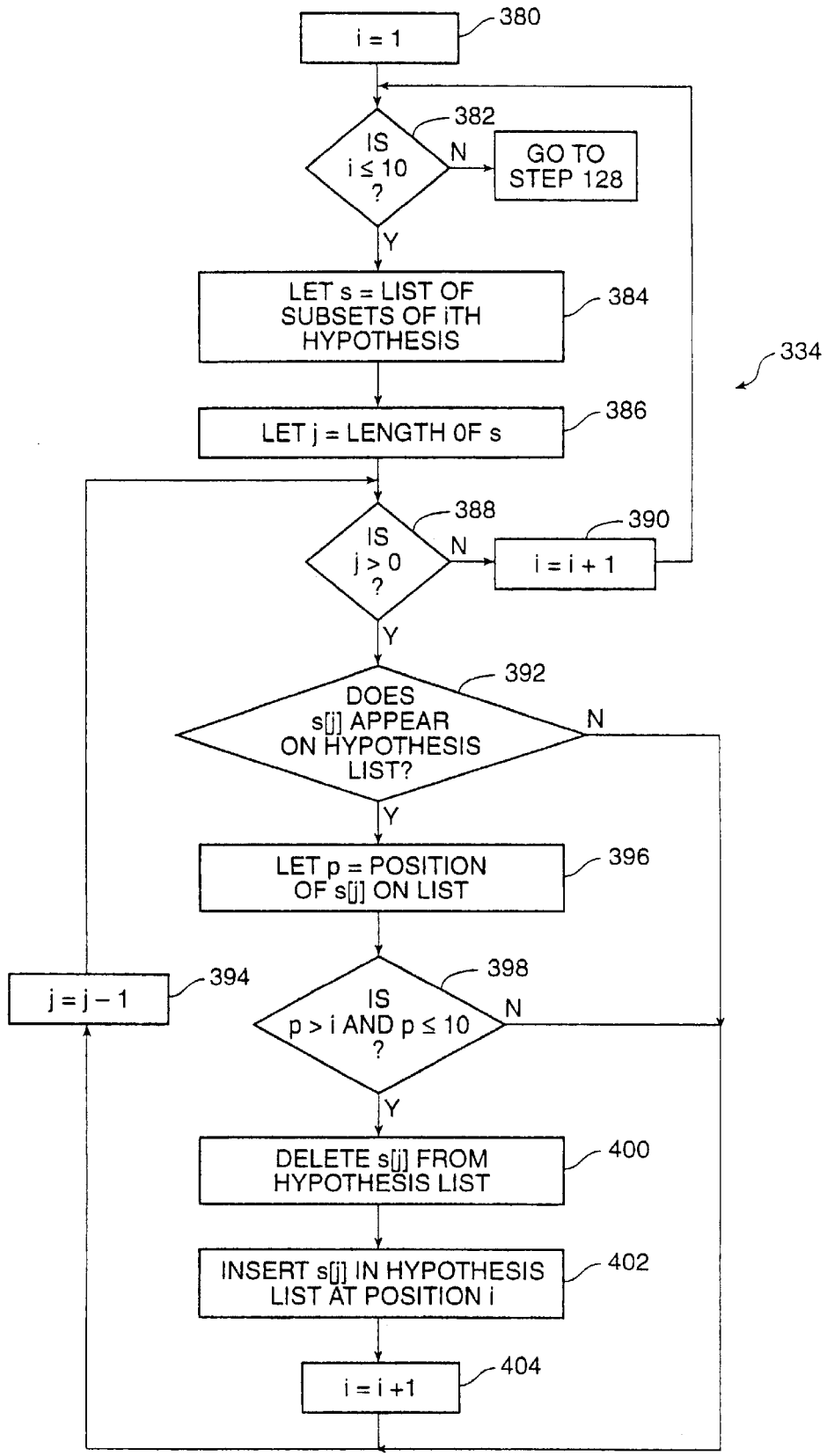
FIG. 19 is a flow diagram which shows the steps in the preferred embodiment of the hypothesis re-ordering algorithm of FIG. 16.

The hypothesis re-ordering algorithm (step 334 of FIG. 16) is shown in greater detail in the flow diagram of FIG. 19. The purpose of the hypothesis re-ordering algorithm is similar to that of the hypothesis insertion algorithm: if it finds a subset character on the hypothesis list, it will promote it. However, because re-ordering the hypotheses is a less drastic step than inserting a hypothesis, the re-ordering algorithm takes less evidence to promote a hypothesis than to insert one.

The hypothesis re-ordering algorithm 334 of FIG. 16 starts at step 380 of FIG. 19, where a counter variable i is set to 1. The counter variable i will refer to the hypothesis that is currently being considered. In the preferred embodiment, the first ten hypotheses will undergo possible re-ordering. Other numbers of re-ordered hypotheses are also possible.

Step 382 then determines whether the counter variable i is less than or equal to 10. If not, then the hypothesis re-ordering algorithm is finished, and control will flow back to step 128 of FIG. 6. Otherwise, control will flow to step 384, where the variable s is loaded with the list of subsets for the ith hypothesis. Step 386 loads the counter variable j with the length of the list in variable s. The counter variable j will iterate over the list s. Step 388 will examine whether the counter variable j is greater than zero. If not, then the examination of the ith hypothesis is finished, and control flows to step 390 where counter variable i is incremented and control then flows back to step 382.

If counter variable j is greater than zero, then step 392 examines whether the jth element of the list s (s[j]) appears in the hypothesis list. If it does not, then it cannot be re-ordered and control flows to step 394, where j is set equal to j−1. Otherwise, step 396 loads variable p with the position of s[j] on the hypothesis list. Step 398 then examines whether the subset character s[j] has a lower confidence than the currently examined hypothesis, by determining whether the variable p is greater than the variable i.

Step 398 also determines whether the subset character s[j] has a high enough confidence value to appear in the first ten hypotheses. (The value of ten in step 398 can vary, as is obvious to those skilled in the art). If either of the logical comparisons at step 398 is false, then the subset character s[j] should not be promoted, and control flows to step 394. Otherwise, step 400 deletes s[j] from the hypothesis list and step 402 inserts s[j] in the hypothesis list at position i, which is just above the current hypothesis. Step 402 ensures that a likely subset character appears in the list before a more complicated character that contains that subset character.

Step 404 increments the counter variable i by 1, to compensate for the fact that a new hypothesis was inserted in the list before the current hypothesis. Control then flows to step 394, where the counter variable j is decremented in order to examine the next subset of hypothesis i.

It will be apparent to those of ordinary skill in the art that there are many different ways of implementing the hypothesis re-ordering algorithm in software. The algorithm shown in FIG. 19 is exemplary, and such skilled persons will realize that the present invention is not limited to embodiments which implement the hypothesis re-ordering algorithm in the manner disclosed herein.

It will be apparent to those skilled in the art that other criteria can be used to re-order the hypothesis list. For example, if two or more hypotheses have similar confidence levels, they can be re-ordered according to the number of strokes or the frequency of occurrence of the character.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

APPENDIX A

CHARACTER GROUPING LIST (PreClassification)

bamboo:
[209 characters]

boat:
[198 characters]

body:
[81 characters]

cloth:
[86 characters]

cover:
[279 characters]

crop:
[82 characters]

dog:
[39 characters]

door:
[85 characters]

eightOne:
[239 characters]

fire:

火青妙劣懶懷悖懺燎恪怫
歲燒慘烤悄恤悟惸燦悖
曾頻惟懼悄熄警縈愴憮
光爆尖弊烯悍煖貴怲忪
些怕耀炳憾悔灶怜愜罩怛
省惜削慌燴悽恨怦懆迤
常輝炎膋焜韻恍爍焙怕
黨堂爐柴怙悃悼儒煳
管慘慎憾怖炫憭炯惆
收愴憒惱憤愣煖㦬慍
情尚怪懂恢僾愔悖悼惕煨
水炯燈燒炊愕燼憫燙湯
性幣愎悴懌愞恬惇遲
少愍憑歧煤恁惇恫愓勘
當頻愉惚災巢
歲憬齡燃煙熺衷豔
光快灰免磷裳燐煤
此勞烊愷特烽燴
也榮恰悔慄怒煨煨
對止忙驚毅焰浼繁
業步忪煩爤焑伴松
251 girl:

如好女她始妊婦媽努妨媒妹娜妙妞姪妒娘嫩妞嬌妁
戈姑娟姻姊嫖媳姆婉奶娃妮妖嬌絮嬋婐姡姰妨
划姪嫂嬪姵姒婆姻婿嬸姐娼嫁妍嬴媛妗
妊弩嫘嫻姝姊妁姨姥笲娉嬉嫁嬋摯娓蠟蝴
娌娛嬪嫗孕姆母賈婢媸娓緣娉媂嬡
姧妍姒屏姒軻娘娗娪姜嬝娌妅
好

110 grass:

其警萬期華共基觀著黃花荆茶帶英蘭若落勤蒙芥
蘇荊芽新斯甚藝藉敬葉藁藩菊羊菱斯苦莉箠芋蘭苗散勤菘蒜
芳甘慕敬鞋莊蓊萁薩花葉瓜范葫薄蓁莞苕菲茂遷芷羲
艾蓉薪莒惠菌驚蒙薩驚芳茂薄絰蕑荷苦蘿巴
蓋茬荖葰葛恭菩茨葉芥蓇苔葇萍菠蕁葷
帚慕茫葵薩薛荷蒔蔥芕芎葽苔菽豐蘿葦
茜芘奘萋菲茵葊茴茖苧芸蓊笠蘑蒔
荊蓄無茹葡薜苴薯菘茴萱荋蘼萹芷
葭蒲葬萊苞鞠莆蓨荖茅莨琑萩蕷黃蔥薊
菠菹夥葩鋟駭蘑著薰芣蘀鸙蔔
菽荻熒葆瓞芺莛殷芾茗芞葰
薂蒑蒼薢莪苹薿艿茭菜茯
夢蓉鞋蘼芩啉葉菦苔芊芊
280 haan:

不在有大成來而五百區面原雄醫太研否緊馬巘巨奈辱辰奢螯蚶蛭蚜
布威奇石碾破願死驗歐臨厚尢右碇碳驅碾匕甗豗戊魷砒蛺
逐匯曆堅劢駿駼碢碪踏碑砒碾碑戇啟碬豸戊甏砀砌
覽礙磐砍嚷碎酊頡硬磊磚硯碌磅蛷磣磾碎磔磊磋
磁硨砦疏篩毆硫碟碬磪磪磾犠磺硯礫褥髕破舕
厭巫礎罠砷蛔砒戰硯罢蛄肓硪硯爪
遼匡臧犪嫚嬼噢拗礨礎噩磅
匠匣戉駢呰贍聰雖恥鷙鴟睯鴇瓦
吃堊駘轤飌勤颯甃曝犘膠睇凸
瓠赸礉觥憇剔埙駛璨碟晴
窊飴巘犪歛殲殷敕
墼聰聊聰
293 hand:

為指提投拉持接求據打推把探技排拋擁括切抗批
換找救損擴抬抢擲搆拍控拉採揮擺擠拊招折振揩
指挌拆扭扶托搖拒挑掛挾摟插擱折引描摒
挽拖拌扮棄挪掉抉摭燴摸猜拔揮擲抹擊
扌剝打披握押扜捆扗拍揮批描摒招
擲擦抆捒扠拏攔扦挼搭綏樁
搡擷摟拼押描挫柂擿趲摁
揢拉撛嚴招揆撛剝措荐
擒摮捏撲抖撞扑撐
搗押撰廢挨揷挂捫
摬拯挂摺摾
揺搓摔

231

What is claimed is:

1. Apparatus for incremental recognition of ideographic handwriting comprising:

a computer entry tablet for entering strokes of an ideographic character in natural stroke order;

an incremental character recognizer coupled to said computer entry tablet, responsive to partial characters, that generates an hypothesis list of at least one candidate character containing said strokes;

means for displaying said hypothesis list;

means for selecting a correct character from among said at least one candidate character of said hypothesis list;

means for providing at least one additional individual stroke in natural stroke order to said incremental character recognizer if none of said at least one candidate character of said hypothesis list have been selected.

2. The apparatus of claim 1, wherein said incremental character recognizer comprises:

a pre-processor, and a statistical pattern classifier.

3. The apparatus of claim 2, wherein said statistical pattern classifier comprises at least one standard neural network layer.

4. The apparatus of claim 2, wherein said statistical pattern classifier comprises a time-delay neural network.

5. The apparatus of claim 1, wherein said incremental character recognizer comprises:

a plurality of detailed classifiers, each detailed classifier recognizing a subset of possible characters;

a pre-classifier, which selects one of the plurality of detailed classifiers to use.

6. The apparatus of claim 1, wherein said incremental character recognizer further includes means for manipulating said hypothesis list of candidate characters.

7. The apparatus of claim 6, wherein said means for manipulating said hypothesis list of candidate characters comprises means for deleting hypothesis.

8. The apparatus of claim 6, wherein said means for manipulating said hypothesis list of candidate characters comprises means for inserting hypothesis.

9. The apparatus of claim 6, wherein said means for manipulating said hypothesis list of candidate characters comprises means for re-ordering the hypothesis.

10. An apparatus for the incremental recognition ideographic characters, comprising an input device for the input of coordinate data representing strokes of an ideographic character;

an input processor for the processing of said coordinate data;

an incremental recognizer that is responsive to partial characters and generates a hypothesis list of at least one candidate character;

a display device;

a window on said display device which is divided into a first region for displaying strokes and a second region for displaying said at least one candidate character.

11. The apparatus of claim 10, wherein said input device is a touchpad that is smaller than 3 inches in width and height.

12. The apparatus of claim 10, where the entire coordinate system of said input device is mapped into the entire coordinate system of said window.

13. The apparatus of claim 10, wherein said window further includes a region for the display of commands.

14. The apparatus of claim 13, wherein said command region lies along the edge of said window.

15. The apparatus of claim 13, wherein said second region for displaying said at least one candidate character lies along the edge of said window.

16. The apparatus of claim 13, wherein said stroke region is divided into a plurality of sub-regions, said input processor responsive to coordinate input in said plurality of sub-regions.

17. A method for incremental recognition of ideographic handwriting comprising in order the steps of:

(1) entering at least one stroke of an ideographic character from a computer entry tablet;

(2) providing said at least one stroke to an incremental character recognizer including a pre-processor and a statistical pattern classifier, said incremental recognizer producing a hypothesis list of at least one candidate character;

(3) displaying said hypothesis list of candidate characters containing said at least one stroke;

(4) selecting a correct character from among said candidate characters on said hypothesis list if it a correct character appears thereon;

(5) entering at least one additional stroke of said ideographic character from said computer entry tablet if no candidate character is a correct character;

(6) providing said at least one additional stroke to said incremental character recognizer and producing an updated hypothesis list of at least one candidate character;

(7) displaying said updated hypothesis list of candidate characters containing every stroke;

(8) selecting a correct character from among said candidate characters on said updated hypothesis list if it a correct character appears thereon; and (9) repeating steps (5) through (8) until a correct character is selected from said updated hypothesis list.

18. The method of claim 17, wherein said statistical pattern classifier comprises at least one standard neural network layer.

19. The method of claim 17, wherein said statistical pattern classifier comprises a time-delay neural network.

20. The method of claim 17, wherein said incremental character recognizer comprises:

a plurality of detailed classifiers, each detailed classifier recognizing a subset of possible characters;

a pre-classifier, which selects one of the plurality of detailed classifiers to use.

21. The method of claim 17, wherein said step of producing said updated hypothesis list includes the step of deleting at least one of said candidate characters from said hypothesis list.

22. The method of claim 17, of wherein said step of producing an updated hypothesis list includes the step of inserting at least one additional candidate character said hypothesis list.

23. The method of claim 17, wherein said candidate characters have an order and wherein said step of producing an updated hypothesis list includes the step of re-ordering at least one of said candidate characters on said updated hypothesis list.

24. A method for incremental recognition of ideographic handwriting comprising in order the steps of:

(1) entering at least one stroke of an ideographic character in natural stroke order from a computer entry tablet;

(2) providing said at least one stroke to an incremental character recognizer including a pre-processor and a statistical pattern classifier, said incremental recognizer producing a hypothesis list of at least one candidate character;

(3) displaying said hypothesis list of candidate characters containing said at least one stroke;

(4) selecting a correct character from among said candidate characters on said hypothesis list if it a correct character appears thereon;

(5) entering at least one additional stroke of said ideographic character in natural stroke order from said computer entry tablet if no candidate character is a correct character;

(6) providing said at least one additional stroke to said incremental character recognizer and producing an updated hypothesis list of at least one candidate character;

(7) displaying said updated hypothesis list of candidate characters containing every stroke;

(8) selecting a correct character from among said candidate characters on said updated hypothesis list if it a correct character appears thereon; and (9) repeating steps (5) through (8) until a correct character is selected from said updated hypothesis list.

* * * * *